Aug. 3, 1965 A. K. JENNINGS ETAL 3,199,111

GRAPHICAL DATA RECORDER SYSTEM

Filed May 21, 1962 6 Sheets-Sheet 1

INVENTORS
ALAN K. JENNINGS
EUGENE SEID
RONALD D. CONE
BY Albert Rosen
Fraser and Bogucki
ATTORNEYS

ALAN K. JENNINGS
EUGENE SEID
RONALD D. CONE
INVENTORS

BY Albert Rosen
Fraser and Bogucki
ATTORNEYS

ALAN K. JENNINGS
EUGENE SEID
RONALD D. CONE
INVENTORS
BY Albert Rosen
Fraser and Bogucki
ATTORNEYS

GRAPHICAL DATA RECORDER SYSTEM

Filed May 21, 1962 6 Sheets-Sheet 4

ALAN K. JENNINGS
EUGENE SEID
RONALD D. CONE
INVENTORS

BY Albert Rosen
Fraser and Bogucki
ATTORNEYS

ALAN K. JENNINGS
EUGENE SEID
RONALD D. CONE
INVENTORS
BY Albert Rosen
Fraser and Bogucki
ATTORNEYS

ALAN K. JENNINGS
EUGENE SEID
RONALD D. CONE
INVENTORS

BY Albert Rosen
Fraser and Bogucki
ATTORNEYS

United States Patent Office 3,199,111
Patented Aug. 3, 1965

3,199,111
GRAPHICAL DATA RECORDER SYSTEM

Alan K. Jennings, Anaheim, Ronald D. Cone, Bellflower, and Eugene Seid, Los Angeles, Calif., assignors to California Computer Products, Inc., Downey, Calif., a corporation of California Filed May 21, 1962, Ser. No. 196,134
23 Claims. (Cl. 346—29)

This invention relates to output systems and devices for digital data processing applications, and more particularly to digitally controlled graphical plotting and display systems.

Despite the many advances in digital data processing systems, many practical limitations on output systems for such processors still remain. Output systems, of course, usually involve a merger of the electronic and mechanical arts, and it has often been found that the requirements of one art are or seem to be incompatible with those of the other. A simple example can be found in the problems arising when one seeks to provide high output data rates for a modern high speed computer. One common technique for increasing the data rate is to multiply the number of mechanical elements used, but this concurrently multiplies the number of circuits needed to control and drive the mechanical elements. At the same time, moreover, this technique markedly decreases the reliability which can be expected from the mechanical elements of the system.

It is perhaps most convenient to visualize the problems which confront the output system designer in terms of the versatility of the system which he adopts, as well as its speed and reliability. The modern general purpose computer may develope data for complex two-dimensional displays having linear or nonlinear bases, and requiring both continuous or line presentations and discontinuous data, such as alphabetical and numerical characters, identification symbols and the like. A high speed printer may readily provide all of the discontinuous elements of information, but is wholly incapable of providing information in continuous graph form, while the converse is likewise true of most modern graphical recorders. Along with this inherent lack of flexibility, it must also be said that there is substantial incompatibility with the manner in which the data is presented by the processing system, so that some special equipment is usually needed for output systems. A line-at-a-time printer, for example, requires buffering as well as addressing and driving circuits of considerable complexity and expense.

Graphical plotters present somewhat different problems, but are essentially no more satisfactory. Before the typical graphical plotter can be used, a digital-to-analog conversion must be effected, with consequent loss of some of the accuracy inherent in the digital signals and with the introduction of error because of the likelihood of drift, noise, and transient effects. Such plotting systems also require skilled personnel, and special preparation for different forms of presentations. Although some analog-signal-controlled graphical plotting systems are known which additionally employ special character printing mechanisms, these merely illustrate the inherent limitations of such systems. The use of a heavy and special character printing head sharply limits the speed of operation of the plotting system, and in any event provides only a limited number of characters or symbols which can be printed. For example, which such previous systems are typically capable of printing only from a set of a few tens of preselected characters, and at a maximum printing rate of a few tens of these characters per minute, an appreciably higher printing rate and completely random selection of *any* arbitrary character or symbol is often required; additionally, the plotting system is typically capable of plotting a few hundreds of line segments per minute while high speed data processing often requires plotting rates of more than ten thousand line segments per minute, and without any appreciable changeover time available for annotation of the plotted segments by the printed characters. Furthermore, in the event that it is desired to make a scale change, or a change to a different alphabet, the existing printing mechanism is no longer suitable.

Certain electronic output systems are known which operate at high speed to provide both analog and digital representations. These, theoretically, have the versatility which is needed. Upon analysis, however, these systems are found to be essentially analog-controlled, and therefore subject to the attendant accuracy limitations of any analog system, and also to be extremely complex, to be somewhat unreliable, and to require periodic recalibration.

It is evident therefore that there exists a need for an output or data presentation system for digital data processors which has versatility and reliability compatible with that of the data processing system itself, as well as adequate speed for most applications. The versatility of the output system should include the ability to present completely arbitrary continuous as well as discontinuous data, both in the form of line or point plotting as well as random symbol printing, and to present the data in widely varying forms and sizes. Furthermore, the output system should be particularly adapted to be compatible with modern programming techniques, and especially it should be capable of making best use of standardized and simplified programs and microprograms. The output system should further have versatility in its manner of use, whether used directly on-line with the data processor, or independently in an off-line application. It may be desired, for example, to record data as it is derived from the processor, and then to reproduce the data in graphical form at a slower rate, or at some later time on demand. As another example, it may be desired to operate any one or more of a number of graphical recorders from the same high speed data processor concurrently. It will be understood by those skilled in the art that the term "data processor" should be construed to mean, relative to the output systems which are discussed here, any source or system which is capable of providing digital data suitable for use by output systems in accordance with the invention.

It is therefore an object of the present invention to provide an improved output system for digital data processors, which system provides a combination of versatility, speed and reliability not heretofore attained.

Another object of the present invention is to provide an improved graphical display system capable of operating in response to stored digital data to provide both continuous and discontinuous display information.

A further object of the present invention is to provide an improved system for presenting graphic records from stored digital data.

A still further object of the present invention is to provide an improved graphical plotting system for operation with data developed by a modern high speed digital data processor, and capable of providing a wide variety of continuous chart displays as well as character information.

Yet another object is to provide an improved means for displaying information in the form of intermixed line segment plots and arbitrary symbols, and with the capability of random selection of the symbols.

These and other objects of systems in accordance with the present invention are achieved through advantageous use of a high speed, incrementally controlled plotter system which is operated under the control of differential vector increment digital data derived either directly from a data processing system or from a cooperating subsidiary data storage. A series of differential vector increment digital signals controls the sequence of movements of the recording instrument in each of two independent normally orthogonal directions, while a third digital signal controls the contact of the recording instrument with the record medium. The recording instrument is stepped from point to point at high speed but with very small incremental movements, so that a substantially continuous presentation, or discontinuous symbols, marks, or characters may be formed, or a combination of these may be supplied.

Systems in accordance with the present invention may include a storage mechanism for the digital data, a particularly useful example comprising a magnetic tape transport unit which is arranged in cooperation with the recorder to provide a wide variety of features. In this example, messages may be organized in blocks on a magnetic tape, with each block having block address, synchronizing, and data or recorder instruction information. By simple selection of a desired message from the tape, a control system for the magnetic tape transport initiates a high speed search scan, in either direction of movement, until the desired message is passed. At this time the control system reverses the tape and moves it at a normal read speed to verify the address. Thereafter, the operation of the recording instrument is begun and proceeds through the recorded instructions to provide the desired plot.

A feature of the invention resides in an arrangement by which individual plots may be obtained, or a series of plots may be provided if desired.

Another aspect of the invention relates to an improved circuit arrangement for the location of data by the comparison of block addresses to desired addresses. In one tape direction, the first inequality is used to determine address location, while in the other direction the last inequality controls. The organization of these circuits provides the essentially complex comparison function in a simple fashion.

A companion feature is the use of two tape speeds in each direction of movement. The system operates in both search and normal read speeds to locate desired plot data rapidly, and to verify the address immediately and reliably. Both these features, as well as other features, make possible the use of relatively low cost tape transports even though high density digital data is recorded on the tape.

Other particular features and advantages of systems in accordance with the invention reside in the capability for use of modern computer programming methods which is made possible by recording systems in accordance with the invention. Because of the incremental stepping of the recording instrument relative to the record medium, the generation of parts of a differentially-varying reference pattern, a character (or any arbitrary pattern) remains exactly the same from point to point in a program, as well as from program to program. Therefore, simplified programming techniques, and program libraries, can be taken full advantage of, and the proper instructions for the generation of the output display can be inserted within the data from the outset. Thereafter, if it is desired or necessary, the data processor itself may drive the recorder, utilizing return signals from the recorder to insure that the maximum speed of the recorder is not exceeded.

Systems in accordance with the invention also have great versatility in other respects as well. Extremely simple but highly precise error checking is feasible, because the digital incremental data which is plotted can itself include an error checking sequence by which an error can be determined visually. Thus, following a plot, the recording instrument may be returned to the point of origin under positive control of further instructions. The plot itself therefore bears a record of any missing pulses or other errors. Because digital incremental values are used, scales may be expanded or compressed as desired, and offset to any range limitations which are chosen.

Systems in accordance with the invention feed data at controlled rates to the recorder, even though the storage unit is operated discontinuously and has relatively slow speed change times. The control system utilizes clock pulses at one rate locked to data from the normal speed tape, and also at another rate which is considerably slower. This slow clock rate is used for varying the length of time to provide compensation intervals and to eliminate the need for buffering equipment.

A better understanding of the invention may be had by reference to the following description, taken in conjunction with the accompanying drawings, in which.

Figure 1:
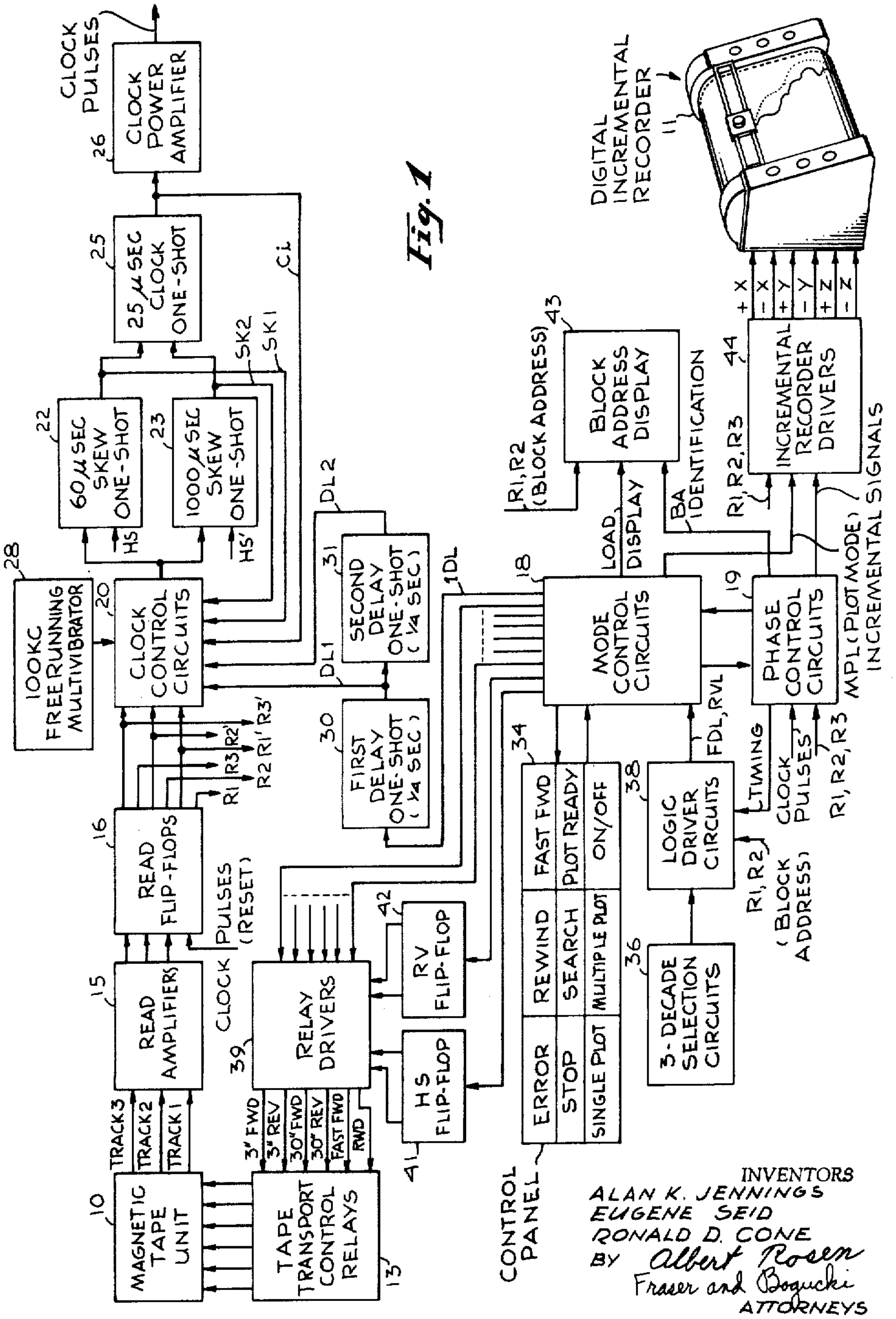
FIG. 1 is a block diagram and partial simplified perspective view of a graphical data recording system in accordance with the present invention.

The example of a system in accordance with the invention which is described in detail herein includes an intercoupled magnetic tape unit 10 and a digital incremental recorder 11. The magnetic tape unit 10, however, is merely one example of a high-capacity, high-density data storage device which is suitable for providing information for generation of graphical plots by the recorder 11. The magnetic tape unit 10 is particularly suitable, however, because output data provided by modern computers, whereby special or general purpose devices, is most often and most conveniently recorded on magnetic tape. Those skilled in the art will recognize, however, that magnetic drum or magnetic disk devices may also be used for this purpose where relatively faster access times are desired, or that punched paper tapes (or punched cards) may also be employed, usually at some sacrifice in the rate at which data may be presented for plotting.

The digital incremental recorder 11 referred to may be a high speed two-axis recorder designed for plotting one variable as a function of another. Such a recorder 11 is not shown or described in detail herein since such digital incremental recorders are standard commercial products known in the art. However, a brief description will be presented in order to better provide a background for the explanation of the system of the invention.

The incremental recorder 11 responds to the receipt of digital incremental signals. The actual recording, or plot, is produced by the movement of a pen over the surface of recording paper. The pen provides line segments of a predetermined line width, such as $\frac{1}{100}$ inch or less. Any two independent axes may be used, but in the present example the axes are assumed to be orthogonal (i.e., X and Y) as is most often encountered. The Y-axis writing or plot is produced by lateral movement of a carriage mounting the pen, and the X-axis writing or plot is produced by rotary motion of a drum holding the recording paper. Provision of Z-axis modulation is provided through the use of a pen solenoid which permits the pen to be lifted from or lowered onto the recording surface in response to electrical input signals. The recorder 11 employs two bi-directional rotary step motors, one for the Y axis (for driving the pin carriage), and the other for the X axis (for driving the drum). Each digital pulse applied to one of the step motors causes the drum or pen carriage to move one increment (say 1/100 of an inch) in either a positive or a negative direction. Thus the increments of movement or line lengths are of the same order as the line width. Electrical inputs are provided so that signals of either positive or negative polarity may be used to actuate the incremental recorder in each of the six operating modes: drum up (rotation in one direction), drum down (rotation in the opposite direction), carriage left, carriage right, pen up, and pen down. Thus, inputs to the recorder from the digital signal source consist of drum up and drum down, carriage left and carriage right, and pen up and pen down pulses. These three groups of signals are generally referred to as the X-axis, the Y-axis and Z-axis signals.

By virtue of the arrangement of the control system of the present invention, a high cost magnetic tape unit need not be employed. Such high cost systems employ low inertia tape handling mechanisms and rapid start and stop mechanisms. The organization of data on the storage medium, the deskewing and timing circuits, and the employment of the search and address identification features permit the magnetic tape unit 10 to be of a simpler and far less costly design than otherwise would be possible. The magnetic tape unit 10 should, however, be capable of both normal read speed, (for example, approximately 3 inches per second) in the forward and backward (reverse) directions, and high read speeds (say, approximately 30 inches per second) in both the forward and backward directions, as well as appreciably faster forward and fast rewind speeds which do not involve the reading of data. Many such systems are commercially available, and accordingly the unit 10 is not described in further detail, except for separate designation of the tape transport control relays 13 which respond to separately provided signals to actuate appropriate electromechanical mechanisms within the magnetic tape unit 10.

Only three data tracks, instead of the conventional seven or more, are employed on the magnetic tape. A density of 200 bits per inch, which is now widely used in most computer formats, may be employed with the tape speed of 3 inches per second to give data at the rate of 200 sets of stepping instructions per second for actuating the high speed digital incremental recorder 11. In this case the recorder 11 is driven at a rate of 200 incremental steps per second. If it is desired to drive the incremental recorder 11 at a higher speed, for example at the rate of 300 incremental steps per second, then the tape speed is proportionately increased, to 4½ inches per second in this example. Higher bit densities, such as the more recently adopted 556 and 800 b.p.i. density, may be accommodated by appropraite adjustment of tape speed in accordance with the speed of operation of the incremental recorder. (Thus, at a 800 bit per inch density, and incremental recorder speeed of 300 steps per second, a tape speed of 1⅛ inches per second is used.) For extremely high bit densities, the tape might be driven too slowly in continuous motion to generate a reliable reproduced signal in the pickup heads. For such applications, however, it becomes feasible to use an incremental stepping of the tape, in synchronism with the stepping of the incremental recorder 11.

The signals reproduced from the separate tracks on the magnetic tape unit 10 are fed to read amplifiers 15 and then applied, after amplification, to read flip-flops 16. The output signals from the read flip-flops 16 represent the respective true values R1, R2 and R3 derived from the tape record tracks 1, 2 and 3, and the complemented values R1', R2' and R3'. After each binary digit is read into a read flip-flop, and the corresponding signal patterns have been generated, the read flip-flops 16 are reset by clock pulses derived in a manner described in more detail below. The output signals derived from the read flip-flops 16 are applied to the mode control circuits 18 and the phase control circuits 19 which perform the principal decision making functions in the control system portion of the system. These read flip-flop signals are also applied to the clock control circuits 20 which provide various timing, timing correction, and clock signal generation functions.

Figure 3:
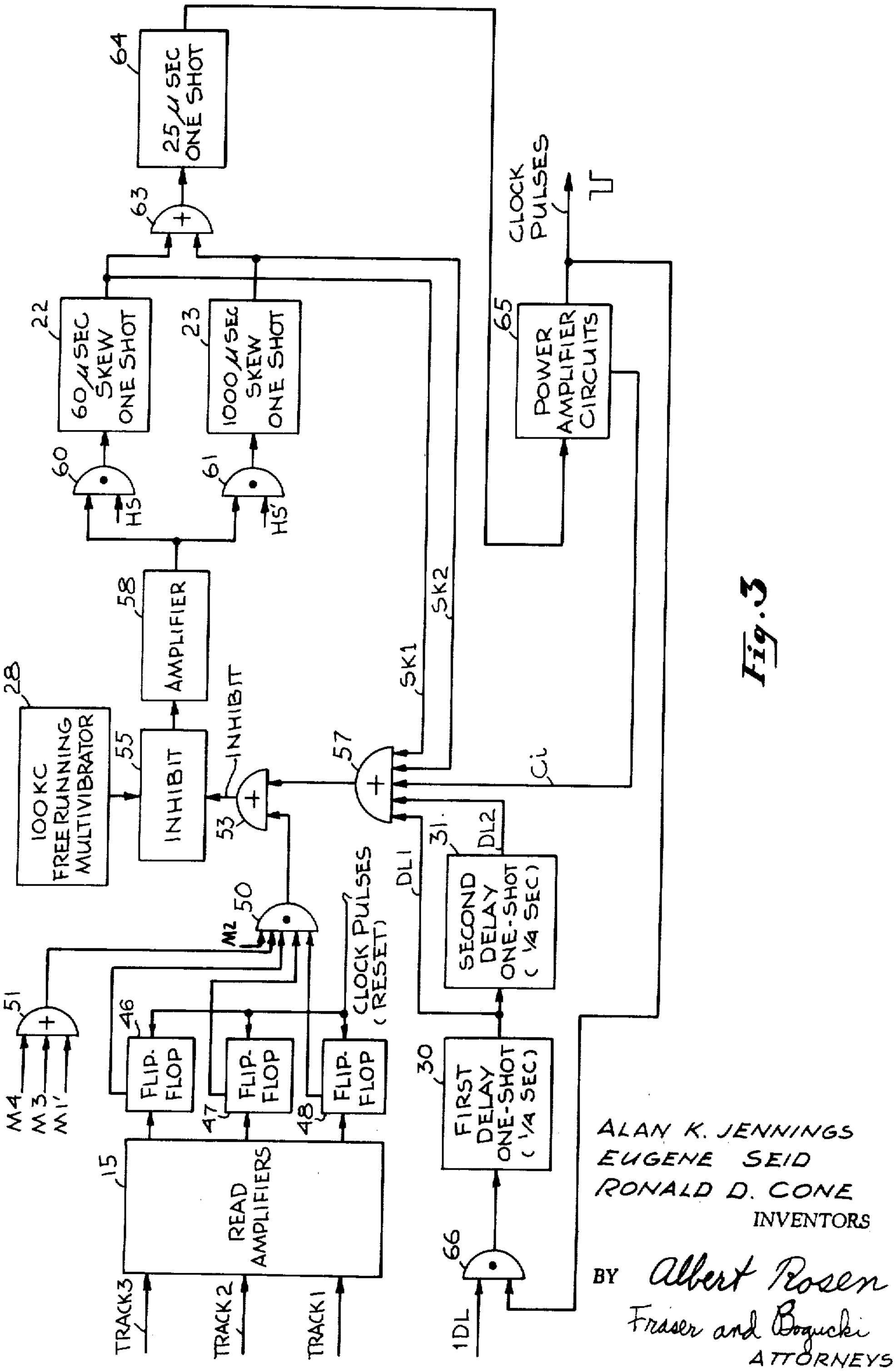
FIG. 3 is a combined block diagram and schematic circuit representation of clock control circuits which may be employed in the arrangement of FIG. 1.

As is typical with magnetic tape systems having a multiple channel magnetic head and operating at high bit densities, the reproduced signals R1, R2, R3 occurring in the same three bit character may be somewhat misaligned due to skewing effects. The clock control circuits 20 together with associated circuits generate reliable clock signals under control of the data despite the presence of these skewing effects as is described in greater detail in conjunction with FIG. 3. Pulses representative of each group of data bits are applied to a pair of skew one-shot multivibrators 22, 23 having different time constants. The output signals derived from these one-shot multivibrators 22, 23 are fed back to the clock control circuits 20, but additionally are also used to initiate output pulses from yet another one-shot multivibrator 25 which provides clock pulses of a desired duration for the system through an associated power amplifier 26.

The skew one-shots 22, 23 are not used concurrently, but are controlled by signals which indicate whether the system is operating to read at 3 to 30 inches per second respectively.

During times in which the magnetic tape unit 10 is being brought up to speed, it is not feasible to generate the clock pulses under control of the data pulses or to operate the incremental recorder 11. During these intervals clock pulses are initiated by a free-running multivibrator 28 providing pulses at a 100 kilocycle rate and are developed at delayed intervals under control of the mode control circuits 18. The period of this slow clock, and the length of time it is used, are controlled by pulses from a pair of delay one-shots 30, 31, each of which provides an approximately ¼ second pulse. A pulse provided from the mode control circuits 18 shortly after the starting of the magnetic tape unit 10 causes successive actuation of the two delay one-shots 30, 31 coincident with the arrival of the next succeeding clock pulse. Clock pulses are then inhibited for one-half second by the clock control circuits 20, and the next clock after the one-half second again initiates the inhibiting action. Different numbers of these slow clocks are used to define time intervals within which various mechanized actions can occur.

The circuit including the two delay one-shots 30, 31 arranged in cascade is of particular value. It is desired to define a ½ second interval with an initiating signal, but it may also be desired to commence a new ½ second interval within a relatively few microseconds thereafter. Prior art multivibrator circuits conventionally require a relatively long discharge interval (e.g. about ⅕ of the active interval of the one-shot). Thus such circuits cannot be fired again unless special discharge circuits are added. The present arrangement, however, accurately defines the desired, relatively long, ½ second interval with successive output pulses, even though it may immediately be re-triggered.

Selection control by an operator at a control panel 34 applies control signals to the mode control circuits 18. The selections which may be made at the control panel 34 include the following:

(1) Rewind
(2) Fast Forward
(3) Stop
(4) Search
(5) Single Plot
(6) Multiple Plot An on/off actuator is also provided on the control panel 34 for control of system power. The selection elements on the control panel 34 further provide visual indications of operating status, as by illuminating an "error" lamp or a "plot ready" lamp. Separate control in the form of a three decade address selection is exercised at a corresponding selection switch 36. This selected address information, allowing selection of any of 1000 addresses or tape locations, is provided to logic driver circuits 38 along with block address signals and timing signals from the phase control circuits 19. The logic driver circuits 38 generate forward or reverse logic signals (FDL and RVL) which are then applied to the mode control circuits 18. With the control input signals thus provided, the mode control circuits 18 develop, as set out in conjunction with FIGS. 4 and 5, appropriate signals to operate the relay drivers 39 for the tape transport control relays 13.

Selection between the 3 and 30 inch per second read speeds is controlled by the application of signals, designated HS and HS', to an appropriate flip-flop 41 coupled to the control relay drivers 39. These signals are also employed at the skew one-shot multivibrators 22, 23. Similarly, control of the forward and reverse directions is accomplished through use of flip-flop 42 designated RV and RV' to provide corresponding RV signals.

It is found to be most useful to employ a block address display 43 to provide a constant indication of the plot which is being prepared or the present block being scanned during the search operation. Block address identification signals from the phase control circuits 19, and load display signals from the mode control circuits 18 together with block address signals derived from the tape, are used to set flip-flops which control the three decade block address display 43 in a manner described below in more detail in conjunction with FIG. 6.

Control of the digital incremental recorder 11 is accomplished by incremental signals from the phase control circuits 19 which denote the significance of the data being read from each bit position on the tape. Incremental recorder drivers 44 for the various X, Y and Z controls of the digital incremental recorder 11 are operated under control of the plot signals from the mode control circuits 18, and additionally from the data signals R1, R2, R3 which are derived from the tape itself. The incremental recorder drivers 44 receive the X, Y and Z signals in sequence, but provide X and Y control of the recorder 11 simultaneously.

A.C. and D.C. power supplies for the various elements of the system have been omitted for clarity, as have various "AND" gates when the application of coincident signals is evident, and the usual drivers, amplifiers and pulse shapers, the uses of which are understood by those skilled in the art. The above description of the general organization of the system in accordance with the invention is merely intended to provide a context for the more specific circuit descriptions to follow. It should be noted, however, that simplicity of system organization has been achieved even though a wide variety of functions is provided.

Figure 2:
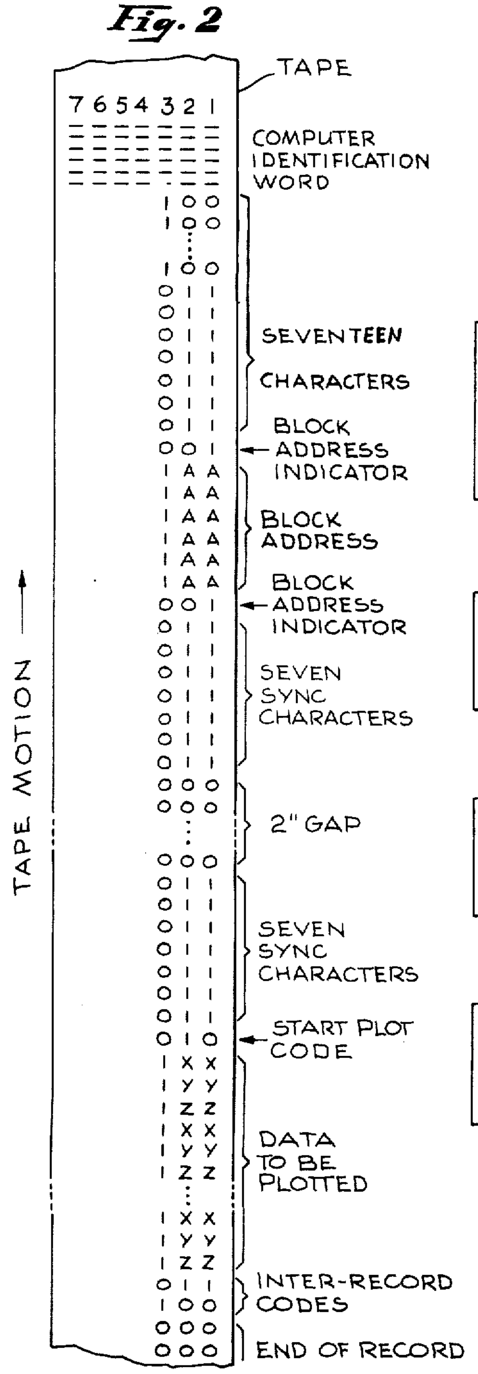
FIG. 2 is a simplified graphical representation of the organization of stored instruction messages on a serial record medium, such as a magnetic tape, and useful in connection with the system depicted in FIG. 1.

In this conjunction, numerous advantages are obtained by virtue of the organization of the block address, synchronizing signals and data or recorder instruction information on the tape as shown in simplified form in FIG. 2. The organization of data on the tape is significant, because it is selected in cooperation with the system to permit easiest location and use of messages to be plotted without requiring expensive or complex circuitry. It will be recognized that the tape and the data bits recorded thereon are greatly modified in FIG. 2 in order to provide easiest visualization of the organization of the data.

The portion of the tape shown in the two columns of FIG. 2 represents one continuous length of tape devoted to a single plot. The amount of data which is to be plotted may vary widely, but the various identification groupings are substantially the same for each plot record, except where one plot is continued over a number of messages. Although only three tracks are employed for providing data for the system, the tape may also include conventional seven track computer identification words from which the data processing system can operate if desired. The prepared tape can then be returned to a computer, and previous plot data can be revised or new data can be added. If a prepared tape is only to be used with a plotting system after preparation, of course, the computer identification word need not be employed.

Following the computer identification word is a sequence of seventeen characters. These consist of ten super codes having the binary values 100 followed by seven sync characters having the binary values 011.

The sync characters assist in controlling the sequencing and timing of the system (this also being set out below). Immediately following the seventeen sync characters is a block address indicator having a characteristic code of 001. The seventeen sync characters and the block address indicator thus signal the presence of the immediately subsequent block address, which consists of six bit positions along the tape, forming three binary coded decimal digits for recognition by the system. The synchronizing codes contribute to the practical advantages of the system in another way. No matter what the 6 character computer identification word may be (it usually consists of 6-bit characters representing an address number) the seven character sync codes (the binary values 011) assure that the block address is properly distinguished.

Each of the three bit groupings at one of the bit positions along the tape has the form 1AA, where the A values represent address digits and the 1's provide an enabling track which insures that a bit is present at the given position. Note that the twelve binary digits form the basis for three 4-bit characters, which is sufficient for the three binary coded decimal digits which are used.

Subsequent to the block address relative to the reading station in the forward direction of movement, another block address indicator and another group of seven sync characters are disposed on the tape. Thereafter, there is an approximately 2 inch gap of zero (0) bits, because it is desired at this point to stop the tape to permit the operator to select the mode of plotting operation. The data to be plotted is then preceded by another group of seven sync characters, in the form previously given, and a start plot code, in the form 010.

The data to be plotted is thereafter applied to the plotting system in sets of three bit characters arranged in three character sequences which follow the order given below:

1XX
1XY
1ZZ
1XX
1YY
1ZZ
etc.

Here again, binary 1 values are continually used in one of the magnetic tape tracks to insure that a binary digit is always present where incremental recorder write or plot information is contained. For the convention adopted for the digital incremental recorder, values of 11 in the X positions are used to cause movement in the −X direction, and values of 01 are used to cause movement in the −X direction. Values of 10 result in no movement along the X axis. Similarly, movement in the +Y direction is initiated by Y values of 11, and movements in the −Y direction are initiated by Y values of 01, with values of 10 resulting in no Y movement. In the ZZ position, a 01 code causes the recording instrument to move away from the recording medium, and a 11 code causes the recording instrument to move into contact with the recording medium. When the recording instrument is in either position, a 10 code for the YY values causes no change in the position. There is thus positive control, even where no change is to be effected.

The data disposed on the tape continues for substantially any length desired, within the limits imposed by the total length of the tape. Subsequent to the data, inter-record codes in the form of one 011 group and a following 100 group are used to provide suspension or termination of the plotting function. Data is sometimes written in more than one record, and if this is the case the inter-record codes permit the data to be begun again following a computer identification word and a subsequent grouping of seven sync characters and a start plot code. This operation does not stop the system but merely inhibits the plotting until the following data is located. Thus this is a continuation of the single plot mode which derives all curve data specified by a single block address. In contrast, the multiple plot mode continues the plotting operation until all of the data from a specified range of block addresses has been plotted.

Figure 7:
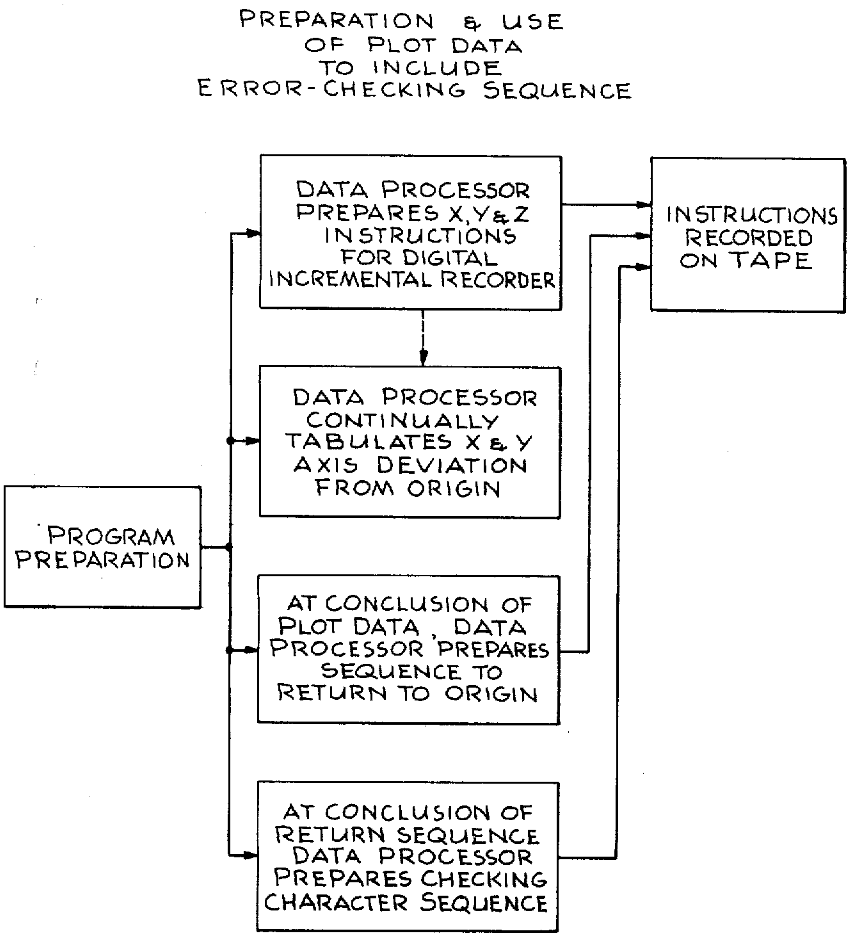
FIG. 7 is a simplified diagram of the steps involved in one form of error checking procedure in accordance with the invention.

Added plot data may also be used to provide an error-checking function, as described below in conjunction with FIG. 7. Error checking may also be performed by the use of simple counting circuits to tabulate to total number of X and Y increments, together with comparison circuits to compare these values with binary-coded values inserted by the data processor. Other checking techniques may also be employed, but the graphical check and record provided as described with FIG. 7 is preferred.

INPUT CIRCUITS, CLOCK CONTROL CIRCUITS AND SKEWING CIRCUITS

The input pulses from tracks 1, 2 and 3 are applied through the read amplifiers 15 to set the read flip-flops 46, 47 and 48. Each of these flip-flops is reset by the subsequently generated clock pulses, but each generates the corresponding primary data signals (R1, R2 and R3) and their complements (R1′, R2′, R3′). Both the primary and complemented data signals are applied to the remaining circuits for maintenance of the proper control functions and driving of the plotter. The complement-value signals are applied to an AND gate 50 to which are also applied the mode signal M2 generated by the mode control circuits 18 in a manner more fully described below. Additionally applied to the AND gate 50 are output signals from an OR circuit 51 which also receives mode signals M4, M3 and M1′. Various arrangements of AND, OR and Inhibit circuitry as well as flip-flops and amplifiers are well known to those skilled in the art and accordingly are not described here in detail for directness and simplicity.

The presence of any one of the M4, M3 and M1′ signals in concurrence with all of the R1′, R2′, R3′ and M2 signals provides a signal to a subsequent OR circuit 53 which controls the inhibit input of an inhibit gate 55 which receives input signals from the 100 kilocycle free-running multivibrator 28 (FIG. 1). Signals may also be provided to the inhibit input from a separate OR circuit 57 which is also coupled to the OR circuit 53. Therefore, the 100 kc. signals will be applied to generate a pulse from an amplifier 58 only in the absence of the inhibit signals which are derived from the AND gate 50 and the OR circuit 57. Amplifier and pulse shaping elements may be used in these combinations, but inasmuch as these are conventional they have not been shown.

The selectivity gated clock pulses which are thus provided are adjusted in time, duration and amplitude before the system clock is ultimately derived. The pair of skew one-shot multivibrators 22, 23 are actuated separately, in dependence upon whether the system is indicated to be in the high speed read mode (HS mode) or in the slower speed mode, indicated by the HS′ state. These conditions are determined by each of a pair of AND gates 60, 61 to which the different HS and HS′ signals are concurrently applied. The actuating clock signals thus initiate either the 60 microsecond pulse from the first skew one-shot 22, or the 100 microsecond pulse from the other skew one-shot 23. These multivibrators 22, 23 may include differentiating circuits to provide sharp spikes at the trailing edge of the generated pulses, for use in triggering the following pulse circuitry after the defined delay interval.

Skew is introduced between the different parallel bits on the tape because of head displacement or twisting of the tape during recording or reproduction. Such effects may cause one of the pulses to lead the others by a substantial amount, the extent of this leading and lagging being dependent upon the speed of movement of the tape. Accordingly, for the slow speed movement the longer 1000 microsecond delay is employed, to place the subsequent clock pulse in a central part of the data pulse interval. The pulses from both skew one-shots 22, 23 are applied through an OR circuit 63 to a 25 microsecond one-shot 64 which generates a pulse of the designated duration for application to power amplifier circuits 65. The output signal from the amplifier 65 is of proper duration, stability and power for driving the associated elements of the system. A component of appropriate polarity from the clock is returned to the OR circuit 57, this component being designated $C_1$, to inhibit initiating the chain of events leading to the generation of clock pulses for at least the 25 microsecond interval.

Each of the pulses generated by the different skew one-shots 22, 23 is also returned as an inhibit signal to the gate 55, it being evident that the presence of a single data bit demands no more than one clock pulse. These signals are designated SK1 and SK2 respectively.

During intervals of discontinuity, when tape speed or direction is changed, or when the search or plot mode is initiated, the mode control circuits 18 of FIG. 1 provide an identifying signal which is termed the 1DL signal and which is applied along with the clock pulses to an AND gate 66 coupled to the input of the first ¼ second delay multivibrator 30. As soon as a clock signal is provided subsequent to the 1DL term becoming true, therefore, the first ¼ second delay pulse is initiated, and the second ¼ delay one-shot 31 is arranged in conventional fashion to be triggered by the trailing edge of the first pulse. Therefore, two contiguous pulses, identified as DL1 and DL2, are provided in succession from the delay one-shots 30, 31 to provide an inhibiting function at the clock control circuits 20 of FIG. 1. This arrangement permits only one clock pulse to be passed every half second as long as the 1DL term remains true. Consequently, the tape is permitted to reach full speed before control of the clock pulses is transferred to the data which is being read from the tape.

The circuit has a number of advantages in addition to its simplicity. Master control is still maintained by the monostable multivibrator, but the effective clock period is greatly lengthened. At the same time, circuits are also employed which permit varying numbers of these relatively widely spaced clock pulses to be used to define different time intervals for control of such elements as the magnetic tape unit 10. The need for special clock sources, timing circuits and counters is eliminated by this arrangement, as is shown below.

MODE CONTROL CIRCUITS, PHASE CONTROL CIRCUITS AND ASSOCIATED ELEMENTS

In order to simplify the description of the control system of the system of FIG. 1, use will be made of exploded Veitch diagrams and logic equations which specify the interconnections to the different gates and bistable elements. As is well known to those skilled in the computer art, systems can be wired, or schematic diagrams can be prepared manually directly from logical equations alone. The Veitch diagrams represent system operating modes far more clearly than do flow diagrams or timing charts when used separately or in conjunction with schematic circuitry. The use of the latter form of descriptive and graphic material would greatly complicate and lengthen the present description in an unnecessary manner, and accordingly such material has been omitted.

The mode control circuits 18 (FIG.1) consist principally of four mode control flip-flops (MCFF) and associated logical gating elements. The MCFF are designated as flip-flops M1, M2, M3 and M4, respectively. The phase control circuits 19 principally comprise three phase control flip-flops (PCFF), designated F1, F2 and F3, and associated logic elements arranged to provide a phase counter. These mode control and phase control circuits 18 and 19 are described and defined in detail, both as to interconnection and operation, in conjunction with FIGS. 4 and 5, respectively.

The control system portion of the invention also includes the 3-decade selection circuits 36, the logic driver circuits 38, the HS flip-flop 41 and the RV flip-flop 42 from the general system of FIG. 1. These elements provide certain terms for the carrying out of the different modes of system operation. Additional control input signals are provided from the control panel 34, each of the energizable selection switches including a conventional hold circuit for maintaining the switch closed until termination of the step involved. The mode control circuits 18 also provide the "error" and "plot ready" indication signals for actuating the corresponding indicators on the control panel 34. The relay drivers 39 and the incremental recorder drivers 44 provide the actuating signals needed by the tape transport control relays 13 and the digital incremental recorder 16. Six different signals appear, each on a different line, to control the magnetic tape unit 10 in different ways. These signals are, respectively, the 3" forward, the 3" reverse, the 30" forward, the 30" reverse, the fast forward and the rewind signals. Six different output signals are provided from the incremental recorder drivers 44, these being the +X, —X, +Y, —Y, +Z and —Z signals. Note again that the drivers 44 release the X and Y instructions simultaneously to the recorder 11. The block address display 43, which forms a very useful part of the system, but which is completely controlled by the other elements of the system, is described in more detail in conjunction with FIG. 6.

In addition to the various signals from the MCFF and the PCFF, and the data signals R1, R2 and R3 and their complements, a number of other terms are employed. These terms usually may be equated with a particular operating condition or indication in one of the modes of system operation as follows:

HS=30" speed (HS'=3" speed)
RV=reverse movement
FDL=forward logic
RVL=reverse logic
SR=search (from control panel)
PL=plot (multiple or single, from control panel)
PLD=plot delayed (from control panel)
RWD=rewind (from control panel)
FWD=fast forward (from control panel)
PLM=multiple plot (from control panel)
IDL=read delay step
HC=holding coil
SU=units digit
ST=tens digit
SH=hundreds digit
SL=switch logic
PR=plot ready (to indicator)
ER=error (to indicator)

It should be borne in mind that the actual operating modes and the particular functional steps which describe the different parts of those modes are not to be equated directly with the above terms. The progress of the system through the various possible modes and states within the modes is set out in the Veitch diagrams of FIGS. 4 and 5 relative to the sequential operation of the MCFF and the PCFF.

Each block on these figures represents a unique system step or phase indicated by the controlling flip-flops. The blocks are so designated and arranged as to permit the operating status of each of the flip-flops, for each of the MCFF or PCFF steps, to be identified directly from the diagram. The marginal brackets indicate the relationships between the "true" or "1" status of each flip-flop and the different operating states of the system. Proceeding along a vertical column or a horizontal row within a given bracket, the associated flip-flop is in a 1 or true condition for all operating states within that row or column. For example, in FIG. 4, flip-flop M1 is in the 1 status for all conditions represented by the second and third columns on the diagram. Conversely, M1 is in the 0 or false status for all other system steps represented in the first and fourth columns on the diagram. Similarly, flip-flop M4 is in the 1 condition for all steps represented in the third and fourth horizontal rows, and in the 0 condition for all other steps. This diagram not only permits ready identification of the different system operating states, but enables changes in the status of the different flip-flops to be directly identified with respect to the steps within the system mode. Thus, when the MCFF is in the "plot" mode, identified by the rectangle positioned in the third column and second row, the chart of FIG. 4 indicates that flip-flops M1, M2 and M3 are true and flip-flop M4 is false.

Figure 4:
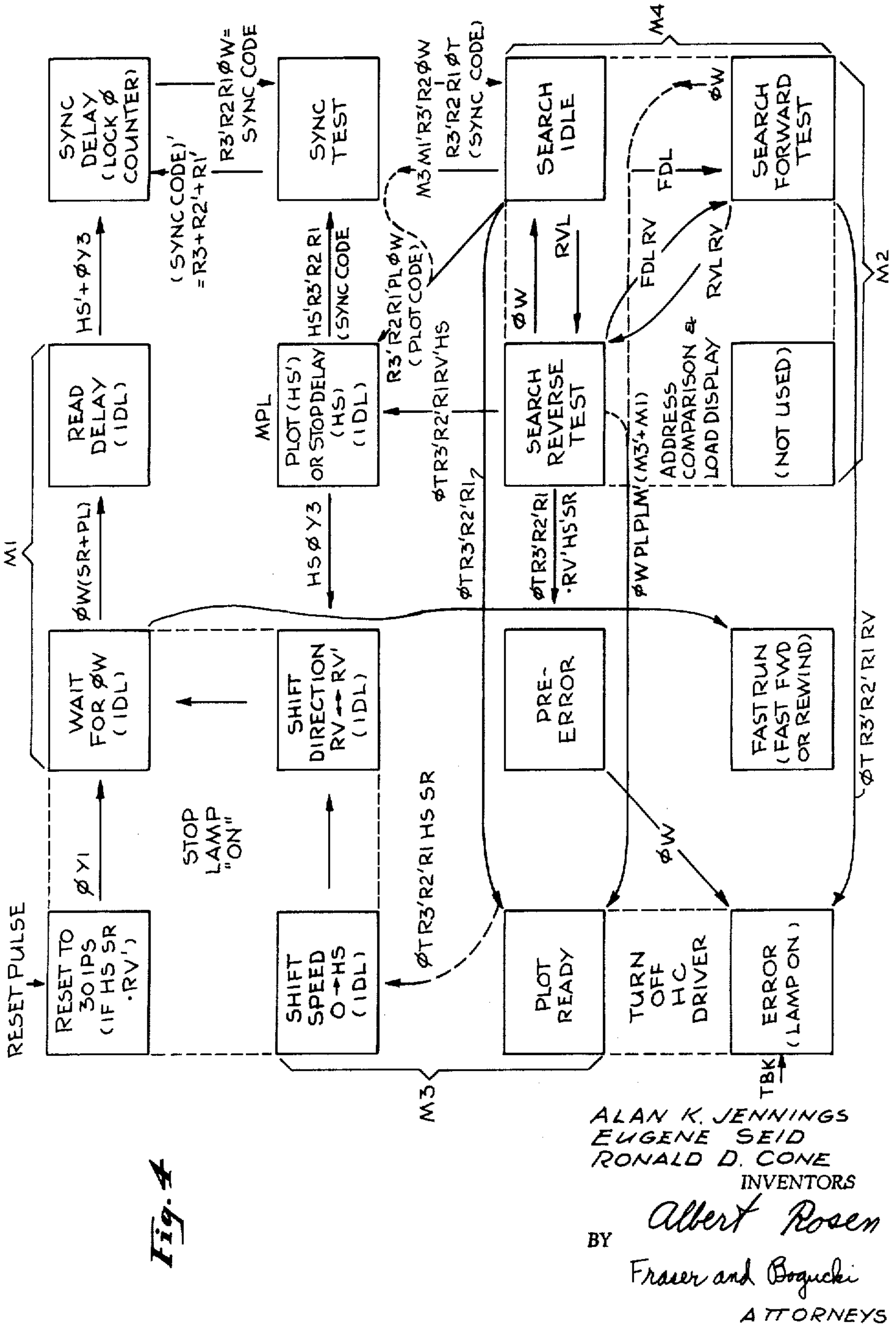
FIG. 4 is a Veitch or sequential flow diagram representing the various states of the mode control circuits of FIG. 1, and the conditions under which the states are changed.
Figure 5:
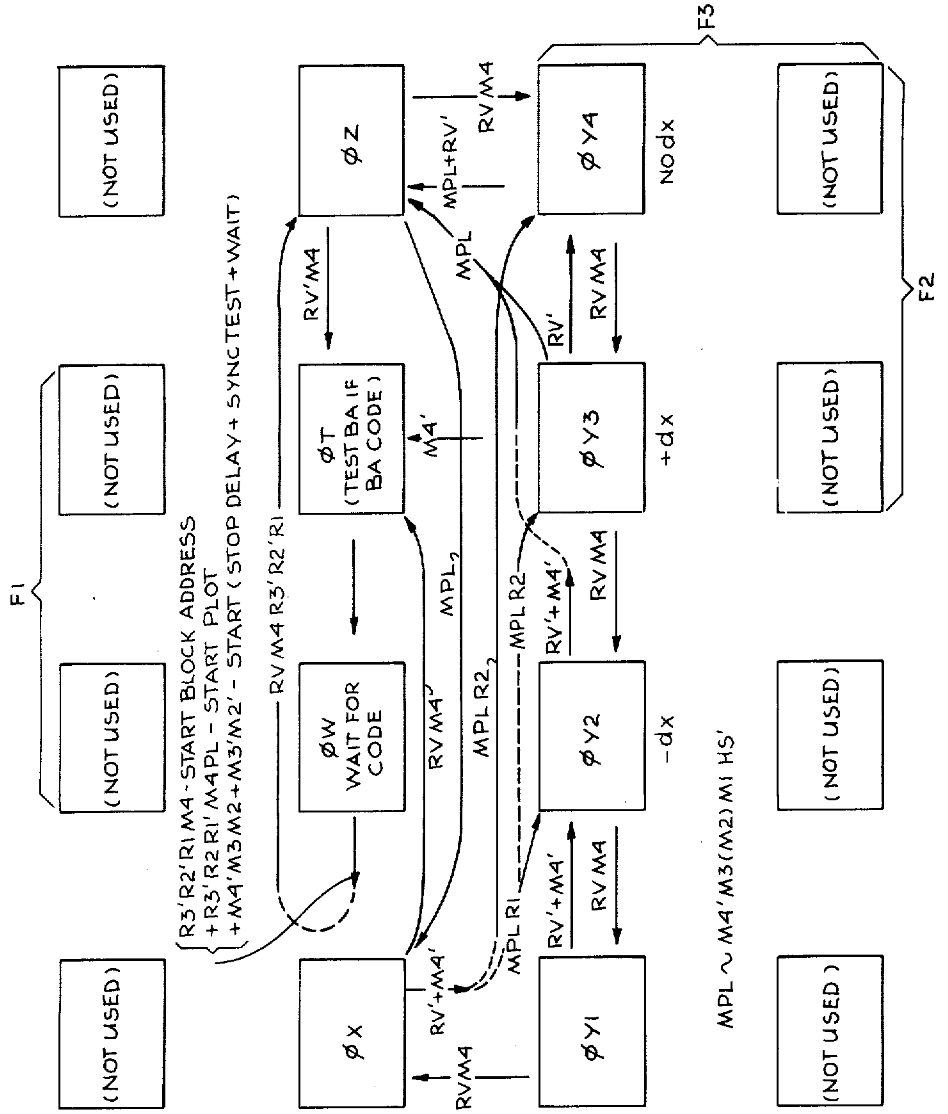
FIG. 5 is a Veitch diagram representing the arrangement and the states of the principal elements of the phase control circuits of the arrangement of FIG. 1.

The diagrams of FIGS. 4 and 5 have additional usefulness because they also aid visualization of the prerequisites for changes in system operating state. The arrows and the accompanying logic terms show the switching sequences and the conditions under which the switching occurs. Each switching action occurs coincident with a clock pulse. An arrow without an accompanying logic term indicates that switching occurs automatically, regardless of the logic, coincident with the next clock pulse.

The following logical equations are definitive of the input signal patterns which determine the operating states of the various gates and flip-flops, and therefore of the wiring interconnections. Conventional logical notation is employed, with the prime (') denoting the complemented output term, and with asterisks (*) being used to designate primary equations (those used more than once) which are each defined in detail below. The input equations for MCFF are as follows, with the one-input of M1 being designated by 1M1, and the zero-input being designated by 0M1, etc.:

**1M1=M4'M2'W1+RVLP1*M3+RVLRVP1***
**+PW*P8*P1***
**0M1=HS'M3'M2M1+PY3*M3'M2M1+P4*MPL***
**+PW*M4M3M1+FDLRVP1***
**1M2=PW*P2*SR+PW*P2*PL**
**0M2=HSPY3*M4'M3M1+P3*M3M1'**
**+P3*RV'HS'SRM1+P3RVM3'+PW*P9*M3'**
**+PW*P9*M1**
**1M3=PW*P4*M2M1'+PW*P1*+RVLRVP1***
**0M3=M2'M1+R3P5*+R2'P5*+R1'P5***
**+FDLP1*M1'+FDLP1*RV**
**1M4=P2*RWD+P2*FWD+PT*P5*P4***
**0M4=P3*HSSRM3M1'+P3*HSRV'M1**
**+PW*R3'M2P13***

The PCFF are similarly identified, and are wired in accordance with the following equations:

**1F1=PX*RVM4+PZ*RV'M4+PX*MPL*R1**
**+PY1*RV'+PY1*M4+F3F2F1'RV**
**0F1=PY2*RVM4+PY3*RV'M4+F3MPL***
**+PW*P8*M4+PW*M3'M2**
**+PW*M4'M3M2+P6***
**1F2=PX*RVM4+PX*MPL*R2+P6*RV**
**+PY2*RV'+PY2*M4'**
**0F2=PT*+PZ*MPL*+PY3*RVM4**
**1F3=PX*RV'+PX*M4'+PZ*RVM4**
**0F3=PY1*RVM4+F3F2F1'RV'*F2M4'+F3MPL***

The HS and RV flip-flops 41, 42 respectively are wired in accordance with the following:

1HS=M4'M3'M2'M1'SR
0HS=P7*M1'
1RV=P7*RV'M1
0RV=P7*RVM1+M4'M3'M2'M1'

The following conditions generate the 1DL and the W1 terms:

1DL=HSM4'M2M1+M3'M1+P7*
W1=PY1*+M3

The primary equations which define the terms used for more than one control purpose are as follows:

P1*=M4M2
P2*=M3'M1
P3*=PT*M4M2R3'R2'R1
P4*=R3'R2R1
P5*=MR4'M3M2M1'
P6*=PW*R3'R2'R1M4
P7*=M4'M3M2'
P8*=R3'R2R1'PLD
P9*=M4PLDPLM'
P10*=PY1*SH1'
P11*=PX*SH4'
P12*=PZ*SU1'
P13*=M3M1'R2
PX*=F3'F2'F1'
PW*=F3'F2'F1
PT*=F3'F2F1
PZ*=F3'F2F1'
PY1*=F3F2'F1'
PY2*=F3F2'F1
PY3*=F3F2F1
PY4*=F3F2F1'
MPL*=M4'M3M1HS'

The following definitive terms are employed in the logic driver circuits 38, in conjunction with the selection circuits 36:

SL1'=(F1'+F3)(PY1*SH1'+PX*SH4'+PY3*ST1'
+PY2*ST4'+PZ*SU1'+PY4*SU4'
SL2'=(F1'+F3)(PY1*SH2'+PX*SH8'+PY3*ST2'
+PY2*ST8'+PZ*SU2'+PY4*SU8')
FDL=SL2R2'+SL2SL1R1'+R2'SL1R1'
RVL=SL2'R2+SL2'SL1'R1+R2SL1'R1

The mode control circuits 18 additionally provide the following terms:

*Control panel indications*

HC=M4M2'M1' (open switch holding coils)
ST=M4'M2' (stop lamp)
PR=M3M2' (plot ready lamp)
ER=M3'M2'M1' (error lamp)

*Output signals to tape transport control relays 13*

T30F=M2HSRV'(+30 i.p.s.)
T30R=M2HSRV(−30 i.p.s.)
T03F=M2HS'RV'(+3 i.p.s.)
T03R=M2HS'RV(−3 i.p.s.)
TFWD=M4M2'FWD(fast FWD)
TRWD=M4M2'RWD(REWIND)

*Output signals to plotter*

XP=MPL*PY3*(+*d*X)
XN=MPL*PY2*(−*d*X)
YP=MPL*F3R2R1(+*d*Y)
YN=MPL*F3R2'(−*d*Y)
ZP=MPL*PZ*R2R1(+Z)
ZN=MPL*PZ*R2'R1(−Z)
$T_1$=(M4+M3+M1')M2R3'R2'R1'

OPERATION OF THE MODE CONTROL, PHASE CONTROL AND ASSOCIATED CIRCUITS

The various modes of operation are selected by the mode control circuits 18, operating in combination with the phase control subsequences represented in the Veitch diagram of FIG. 5. The normal sequences of operation set out in FIGS. 4 and 5 will now be discussed generally, prior to a detailed description of the sequencing through the different phase conditions and selection of each of the successive modes and states.

The block address of the data which is to be plotted by the recorder 11 is selected by an operator, by a manual setting of the 3-decade selection circuits 36. The operator then presses the search button on the control panel 34 and the tape is driven in the forward direction at the high search speed of 30" per second. After the tape is brought up to speed, the data recorded on the tape is reproduced and supplied to the mode control circuits 18 and the phase control circuits 19, from the read amplifiers 16. A block address which is identified by the circuits 18, 19, is read from the tape as load display information is entered into the block address display 43, and concurrently is compared within the mode control circuits 18 with the address set into the 3-decade selection circuits 36. The block addresses recorded on the tape are organized in ascending numerical order, although the sequence need not be continuous. As the addresses are reproduced while the tape is moving in the forward direction, therefore, the addresses increase in numerical value. If the address read from the tape is a lower number than the desired address, the system continues to move the tape forward at 30" per second to the next succeeding block address. As this block address is read by the system, another comparison is made and the indication on the block address display 43 is revised. With the tape moving in the forward direction at high speed, this process continues until coincidence occurs between the address read from the tape and the block address set into the 3-decade selection circuits 36.

When the comparison of the addresses establishes that there is coincidence between the values, the control circuits stop the magnetic tape unit 10, and initiate a reverse movement at the normal reading speed of 3" per second. During this reverse normal speed movement, the block address is again read from the tape and compared with the desired address. If the coincidence in addresses is verified, the magnetic tape unit 10 is again stopped and the "plot ready" indicator on the control panel 34 is lit. If coincidence is not verified, the magnetic tape is likewise stopped, but the "error" indicator is lit on the control panel 34.

The system progresses through a like but slightly modified sequence in the event that the first block address read from the tape is a higher number than the desired address. If the comparison indicates that this relationship exists, the magnetic tape unit 10 is stopped, and the tape is then driven in the reverse direction at 30" per second. As the various block addresses are read, they are again displayed in the block address display 43. Comparisons are continually made until coincidence occurs, at which time the magnetic tape unit 10 is stopped, and the tape is reversed in direction and moved forward at 3" per second. As the address is read a second time from the tape at the normal reading speed, a comparison is again made and if coincidence is verified the tape unit 10 is stopped and the "plot ready" indicator is lit. If coincidence is not verified, the "error" indicator is lit with the tape unit 10 stopped. Error will also be indicated in the event that during the high speed reverse scanning sequence the comparison circuits indicate that a block address which is read from the tape is lower in magnitude than the desired address set into the 3-decade selection circuits 36.

After completion of either the forward or reverse search, the tape remains stopped and no further action takes place until the operator selects any one of the switches on the control panel 34. Either the single plot or multiple plot buttons may then be pressed to initiate the data plotting mode of operation. If the multiple plot switch is to be selected, the selection circuits 36 are switched to a new address, that of the block address following the last of the data to be plotted. When a signal is provided from the control panel 34 for the appropriate plotting mode, the tape unit 10 is operated in the forward direction at 3″ per second. The plotting begins after a start plot code is identified, and the recorder 11 is then provided with appropriate signals to move the recording instrument and record member in two orthogonal directions (X and Y) relative to each other, and to move the recording instrument into engagement with or out of contact with the record member (A axis control). Plotting continues until inter-record codes following the data are identified.

When the system is operating in the single plot mode, the tape continues moving until the next block address is read, and the magnetic tape unit 10 is then stopped and the "plot ready" indicator is lit on the control panel 34. The operator may then select a new address and initiate a new search, or initiate a new plot at the new block address. In the event that the single block address identifies data distributed over several records, the system continues forward operation of the tape through the inter-record gap and initiates plotting again after the start plot code for the next data sequence is identified. The magnetic tape unit 10 is again stopped when the next block address is located.

When the system is operating in the multiple plot mode, the selection circuits 36 establish the desired address for the termination of plotting. The system continues to advance at the normal speed, with plotting suspended from the end of one sequence of data to the beginning of the next, and with each successive address being compared to the desired address. When coincidence between the desired actual addresses is identified, the magnetic tape unit 10 is stopped and the "plot ready" indicator is lit, to await initiation of a new search or plot mode.

Certain factors and relationships in the organization of data on the tape should be appreciated prior to a review of the modes and subsequences in detail. All code groups or characters which affect the operation of the system contain at least one binary 1. Thus, referring briefly again to FIG. 2, all of the various sync characters, the block address indicator, the block address itself, and the data to be plotted include binary 1's in at least one position. Gaps which are provided between various groups of sync characters and between the end of one record and start of another permit adjustment for operating rates and start-stop times, but provide no positive control function. If all three bits in any one character are zeros, the clock circuit in the system remains inhibited and all logic and data plotting circuits remain unaffected.

This feature of providing a positive indication of the presence of a character in the data to be plotted is of special significance inasmuch as it appreciably enhances system reliability and accuracy. The data signals may be used in the generation of clock pulses and during compensation for skewing effects without requiring complex circuits or an expensive tape transport. The track which is provided with a succession of "1" bits constitutes an enabling track for the data. This is used in conjunction with the successive X ,Y and Z characters as they are provided in repetitive sequences.

It should be noted that the prime requisite for a plotting system is that it have a reliability which equals or exceeds that of the highly reliable system with which it operates. It is always possible, of course, for tape imperfections or other factors to result in lost data. If a character is lost with systems in accordance with the invention, however, a positive error indication is provided because of the nature of the plot which can result. The system may continue to operate in its regular sequence, but with the characters actuating the recorder 11 in a different sequence, depending upon the placement and the number of the missing characters. The displacement of the data from its regular sequence immediately becomes apparent in the plot, because the instructions for the recording instrument become inconsistent with those for the X and Y axes. The recording instrument either is caused to make a discontinuous plot unlike that previously made, or the curve or character being plotted may become completely disrupted. Other errors may be detected by an error checking sequence as described below. For these reasons, it becomes highly unlikely that even a single error will remain undetected for even a brief period with systems in accordance with the invention.

Furthermore, such systems in accordance with the invention enable a positive check of an entire plot to be performed which verifies the continuous proper functioning of the complete system including the recorder 11, the magnetic tape unit 10, as well as data storage in the magnetic tape storage medium. This verification may be performed by the data on the magnetic tape causing the recorder to draw certain check symbols immediately before and after drawing the significant curves and symbols. For instance, a "plus" symbol may be drawn in two parts: first an L-shaped part prior to the significant plotting, and finally, subsequent to the significant plotting, a modified version of an L which has been rotated 180° and whose corner is intended to coincide with the corner of the recorded L. If the complete system has functioned properly during this entire operation, the two L portions will match perfectly, and if any error has occurred during this entire operation, it is highly unlikely that the two L's will match. Consequently, a positive error indication may be derived from a casual visual check of the finished record.

SYSTEM OPERATING MODES

Three flip-flops comprising the PCFF generate the phase control signals in accordance with the logic set out heretofore and the states illustrated in the Veitch diagram of FIG. 5. The PCFF indicate eight different phase steps, namely, $\phi$X, $\phi$Y1, $\phi$Y2, $\phi$Y3, $\phi$Y4, $\phi$Z, $\phi$T and $\phi$W although they proceed through these phase steps in varying sequences. The system may be said to operate in different modes, including a forward search mode, a reverse search mode, a single plot mode and a multiple plot mode. Within these modes occur in varying sequences the different steps or states illustrated in FIG. 4 and the different phases illustrated in FIG. 5.

*Forward search mode.*—Both the forward and reverse search modes begin after selection of a desired address by the operator and energization of the search switch on the control panel 34. Energization of the search switch generates the SR logic term, which sets F1 true in the PCFF, and M1 through M4 false in the MCFF. Thus, the MCFF is in *reset* condition, and the PCFF is in either $\phi$W, $\phi$T, $\phi$Y2, or $\phi$Y3 phase. The HS flip-flop is set true, and the RV flip-flop false (FIG. 4), so that when the magnetic tape unit is energized the tape is run at 30″ per second in the forward direction. This is not necessarily, of course, the proper direction of movement to locate the selected block address. The mode control system is set into the *wait* step (FIG. 4), after the PCFF is cycled from whatever state it is in to the $\phi$Y1 state. Successive clock pulses are derived to switch the PCFF through the phases from $\phi$Y2 (the extreme case), to $\phi$Y3, $\phi$T, $\phi$W, $\phi$X and $\phi$Y1, or through whatever lesser part of this cycle is required with the appropriate number of clock pulses. When the PCFF reaches $\phi$Y1, after two to five clock pulses, the next clock pulse switches the MCFF to the *wait* step and the PCFF to $\phi$Y2.

The 1DL term becomes true and the next clock pulse triggers the first and second delay one shots 30, 31 (FIG. 1) to inhibit the pulses derived from the free-running multi-vibrator 28 within the clock control circuits 20 as described above in conjunction with FIG. 3. Therefore, a master clock pulse is provided only once each half second during this interval. The next three clock pulses, occurring at the extended half second intervals, switch the PCFF successively through $\phi$Y2, to $\phi$Y3 to $\phi$T to $\phi$W. When $\phi$W is reached, the MCFF is switched to the *read delay* step and the magnetic tape unit 10 is concurrently started forward at 30" per second. The 1DL term remains true in the *read delay* step, and clock pulses again occur only every ½ second, with the PCFF again cycling through five phases starting with $\phi$X as an initial state to $\phi$T with the fifth clock pulse. The fourth such delayed clock pulse, at $\phi$Y3, also switches the MCFF to the next step, termed *sync delay,* where the 1DL term is no longer true and the clock returns to its normal rate following the fifth half-second delay. The next clock pulse switches the PCFF to $\phi$W and the PCFF and MCFF remain locked in the $\phi$W and *sync delay* steps until a sync code is read from the tape.

In the *sync delay* step, the system searches for the seven sync codes ($R3'R2R1$=011) which precede and follow each block address. During this searching, the clock is controlled by the data bits read from the tape. When a sync code is read, the MCFF is switched to *sync test,* and the PCFF is unlocked. The next six sync codes switch the phase counter (FIG. 5) through $\phi$W to $\phi$X to $\phi$Y1 to $\phi$Y2 to $\phi$Y3 to $\phi$T. The seventh sync code is read at $\phi$T and switches the MCFF to *search idle,* and the PCFF is switched to $\phi$W where it is again locked up.

The system operates to correctly segregate the group of exactly seven codes which precedes a block address or data to be plotted from other possible conditions which might arise, including the computer identification words. If fewer than seven sync codes are read, or if some other code is read during the sequence, the MCFF is switched back to *sync delay.* The PCFF is sequenced in this condition until it again locks up in $\phi$W, regardless of the code. Thus the MCFF can remain in the *sync delay* step until another sync code is read, at which time the process is repeated.

If only one sync code is read, the PCFF is not sequenced out of $\phi$W, and the MCFF is switched to *sync test* and immediately back to *sync delay.* Thus the search for seven sync codes may begin again substantially immediately.

If an eighth sync code is read, the MCFF has reached the *search idle* step, and the next two clock pulses switch the MCFF from *search idle,* to *sync test* and then back to *sync delay,* at which state another search for seven sync characters begins. If the next code after the seven sync codes is a start plot code, this indicates that the wrong group of sync characters was read, and that the next data will be the data to be plotted and not the block address. Here again, the next two clock pulses switch the MCFF back to *sync delay.*

The correct sequence of seven sync characters are identified, with the MCFF in *search idle,* by the subsequent provision of the block address indicator $$(R3'R2'R1=011)$$

When this code group is provided, the PCFF is switched to $\phi$X, and the six code groups of the block address are separately identified under control of the PCFF, which sequences from $\phi$X to $\phi$Y1 to $\phi$Y2 to $\phi$Y3 to $\phi$Y4 to $\phi$Z. The next code at $\phi$T, normally another block address indicator, switches the counter back to $\phi$W. During this sequence, the block address on the tape is compared with the desired address established by the setting of the 3-decade selection switch. The results of the comparison determine whether the tape will continue to run forward, or be stopped and run in reverse.

With the 3-decade selection switch set at a higher number for the desired address than the number of the block address, the next clock pulse switches the MCFF to *search forward test.* In the forward *direction of movement,* the most significant digit in the block address is read first, and switching may occur before the PCFF completes the counting sequence. The PCFF continues through its counting sequence, however, and switches $\phi$W, at which time the MCFF switches back to *search idle.* In the *search idle* step under these conditions, the system is seeking another block address indicator. Therefore, the PCFF remains locked in $\phi$W and the MCFF in *search idle* until the next block address indicator is read, at which time the PCFF switching sequence and the comparison are repeated. If the setting of the desired address and the address read from the tape are identical, the MCFF remains in *search idle* until the entire block address has been read (six code groups). At the end of this sequence the PCFF is in $\phi$T step and the next code group is the block address indicator after the block address. This code group switches the MCFF to the *shift speed* step, and the PCFF to $\phi$W, and stops the magnetic tape unit 10.

The system now begins the sequence in which the same block address is ultimately read in reverse at normal reading speed. The 1DL term becomes true, and the next clock pulse triggers the ½ second delay circuits in FIG. 1 to provide the ½ second clock pulse inhibition. The clock pulse also sets the HS flip-flop false, and the MCFF is switched to *shift direction* with the RV flip-flop being set true at the next clock pulse and the 1DL term remaining true. Therefore, the next clock pulse is also delayed ½ second and switches the MCFF to the *wait* step. At the *wait* step, the magnetic tape unit is ready to start in the reverse direction at 3" per second, the normal reading speed. The next clock pulse at the slow clock rate switches the MCFF to the *read delay* step and starts the tape movement and the tape reading in the manner previously described.

The entire process of searching for seven sync codes and comparing the block address with the desired address set into the selection switch is now repeated, but with the tape running in reverse at 3" per second. The MCFF and the PCFF operate in the same way, with two differences from the previous description. First the HS' term is now true, and the delay time caused by the action of the delay one shots 30, 31 during the *read delay* step and the *sync delay* step now consists of two long clock intervals (1 second) instead of five long clock intervals (2½ seconds). Second, the phase counter is sequenced in reverse in order to maintain proper correspondence between block address codes and PCFF phases during the comparison.

Usually, there will be coincidence between the tape address and the desired address because the same block address position previously identified is being read again. If coincidence occurs, the MCFF switches to *plot ready* after the PCFF reaches $\phi$T and the second block address indicator code is read from the tape, thus satisfying the conditions for turning the "plot ready" indicator on at the control panel, and for turning off the magnetic tape unit 10 and opening the hold circuits on the control panel. This same clock pulse also switches the PCFF to $\phi$W where it remains locked.

If coincidence does not immediately occur, the MCFF will be in *search reverse test* when the PCFF reaches $\phi$T, and at $\phi$W the MCFF will return to *search idle* and continue searching. If for some reason the block address indicator is read at $\phi$T while the MCFF is in *search forward test,* then the MCFF switches to the *pre-error* step, and then to the *error* step. Signals are provided in this step to stop the tape, de-energize the hold circuit, and turn on the "error" indicator on the control panel.

In the event that the desired address established by the selection switch setting is lower than the number of the first block address read from the tape, the MCFF goes into the *search reverse test* step at the next clock pulse. When the PCFF is sequenced to $\phi$T, the next clock pulse switches the MCFF to *stop delay* and the PCFF to $\phi$W. In the *stop delay* step the 1DL term is true and the slow clock rate is used, so that the tape is continued running for two seconds. This sequence insures that on the return path the tape will be up to reading speed in sufficient time to read the block address indicator preceding the block address which cause the reversal of direction. Using the slow clock rate, the next five clock pulses switch the PCFF through the counting sequence φW to φX to φY1 to φY2 to φY3 to φT. The fifth clock pulse also switches the MCFF from *stop delay* to *shift direction* and stops the magnetic tape unit. The 1DL term remains true, so that the sixth clock pulse is also delayed ½ second before it sets the RV flip-flop true and switches to PCFF to φW. The MCFF are now in the *wait* step, and the system is in the reverse search mode, described in the next section hereafter.

Thus it will be seen that compensation for tape startup and stop times is effected completely electronically within the control system, and that the need for a high speed, high cost tape transport system and for buffering equipment is eliminated. Most computer formats involve relatively small inter-messages gaps, such as ¾ inch. Tape transports for use with such formats must inherently have high start-stop speeds and use short lengths of travel in achieving full speed or full stop. By programming larger gaps in the data, and by utilizing sync codes and other features in the manner described, however, the present invention permits low cost tape transports to be used with full reliability and effectiveness. With this organization of the data and the system it becomes unimportant that the discontinuities and changes in tape movement require relatively long intervals of time.

Selective control of changes in tape movement is effected by defining compensating time intervals with different numbers of slow clock pulses. A standard delay of 2 seconds is defined by 4 slow clocks, for example. Such a system has a number of features which materially benefit simplicity, reliability and cost. For example, system operation remains keyed to the basic rate of the free-running multivibrator from which the clock pulses initiate. Varying intervals are needed to compensate for the different actions which take place within the mechanical parts of the system, such as reversing direction and shifting from one speed to another. With most magnetic tape systems, compensation is usually provided in the form of mechanical or electronic buffering systems, or a combination of these, but no such added equipment is required in systems in accordance with the present invention. The versatility of systems in accordance with the invention is illustrated by the fact that extremely slow start and stop times can readily be tolerated because of the variety of positively determinable delay intervals which can be used for control. This, in combination with the use of cooperating circuitry for controlling skewing effects, permits a low cost transport mechanism to be employed even though standard high density computer codes are employed.

*Reverse search mode*.—As described above, if the first block address which is read from the tape in the forward search mode was found to be higher than the setting of the selection switch, the system automatically switches to the reverse search mode. This mode begins with the MCFF in the *wait* step and the PCFF in φW. The next slow clock pulse, ½ second later, switches the MCFF to the *read delay* step and starts the tape in reverse at the search speed of 30″ per second. The search for seven sync characters followed by the block address indicator, during which the MCFF is switched from *read delay* to *sync delay*, *sync test* and *search idle*, is the same as in the forward search mode.

Because the block addresses are now read in reverse order, the PCFF sequence during the comparison cycle is also reversed to maintain the proper correspondence between the code groups which are read and the counter states which are indicated by the PCFF. The block address indicator therefore switches the counter from φW to φZ, and the six successive code groups in the address then switch the counter from φZ to φY4 to φY3 to φY2 to φY1 to φX to φT. The next clock pulse, coincident with the block address indicator, switches the PCFF from φT to φW.

Because the block address is read in reverse in this mode, the most significant digit is read last, so that decisions cannot be made as to whether the desired address or the address being read is higher until all six code groups in the block address have been read. As each pair of code groups is compared, the MCFF switches between *search forward test* and *search reverse test*, depending upon whether the digit in the block address is higher or lower than that set into the selection switches. After the last digit is read, if the block address is still higher than the desired address, the MCFF is in *search reverse test* at the same time that PCFF is in φT. The next clock pulse switches the PCFF to φW and the second clock pulse switches the MCFF back to *search idle*. The search then resumes until the next block address is read, at which time the comparison process is repeated.

When coincidence is obtained between all three of the decimal digits of the address which is read and the desired address, the MCFF remains in *search idle* throughout the comparison sequence. The MCFF is switched to the *shift speed* step when the block address indicator is read, in the same manner as in the forward search mode. This step stops the tape and initiates the ½ second clock delay intervals. The next clock pulse sets the HS flip-flop false and switches the MCFF to the *shift direction* step. The second clock pulse sets the RV flip-flop false and switches the MCFF to *wait*.

The system is again prepared by this sequence for a re-verification of the address by reading at normal speed in the opposite direction. The searching for the seven sync codes, block address indicator and the comparing of the block address to the desired address are again repeated with the tape running forward at 3″ per second. The PCFF is now set to be sequenced in the forward direction, and when the block address is read coincidence between the block address and the desired address is normally identified. When the block address indicator at the end of the address is read, the MCFF switches from *search idle* to *plot ready*, the tape is stopped and the holding circuit de-energized and the "plot ready" indicator is lit on the control panel. If coincidence does not occur, the MCFF switches from *search reverse* test to the *error* step via the pre-error step, which stops the magnetic tape unit and de-energizes the holding circuit, turning the "error" indicator on the control panel on.

An error will also be indicated and the MCFF will switch to the *error* step if, when any block address is read in the reverse search mode, the comparison indicates that the tape address is lower than the desired address set into the switches.

*Single plot mode*.—Both the single plot and multiple plot modes begin after the desired address has been found and the "plot ready" indicator has been lit on the control panel. When the single plot switch is energized, the PL logic term is generated, which sets F1 true in the PCFF and M1, M2, M3 and M4 false in the MCFF, in the same manner as the SR term when the search button is energized. With the MCFF reset by the PL term, the RV flip-flop is set in the false state, and the tape is caused to travel in the forward direction at 3 inches per second. The logic sequences for both the MCFF and the PCFF are the same as in the forward search mode, except that the time between *read delay* and *sync relay* is one slow clock interval instead of four slow clock intervals.

With the MCFF in *sync delay*, and the PCFF in φW, the system searches for a sequence of seven sync codes. In these steps, the same conditions as those described in conjunction with the forward switch mode determine the stepping of the MCFF to *sync test*, then to *search idle* when the seven sync codes are read from the tape. As before, the PCFF sequences through six steps and locks in φW. If more or less than seven sync codes are read, the MCFF returns to *sync delay* and the search for the seven sync codes begins again.

After the correct sequence of seven sync codes has been identified, the start plot code must be identified. If the next code group is the correct start plot code (R3'R2R1'=010)

the MCFF switches to the *plot* step and the PCFF to $\phi$X. The MPL term now becomes true, and the next plot pulse shifts the PCFF to $\phi$Y2, $\phi$Y3 or $\phi$Y4, depending upon whether the X code instruction directs a +X, −X or no X movement. This action is determined by the states of the read flip-flops, as follows:

R3R2'R1→$\phi$Y2
R3R2R1→$\phi$Y3
R3R2R1'→$\phi$Y4

At this time the incremental recorder drivers 44 of FIG. 1 are set to drive the digital incremental recorder 11 to plot the X and Y signals simultaneously. That is, the X signal is stored momentarily and upon receipt of the next clock pulse, coincident with the succeeding Y code group, the X and Y plotter signals are generated simultaneously. Concurrently, the phase counter is shifted to $\phi$Z. The next clock pulse, along with the Z code group generates the Z signals for the plotter and also shifts the PCFF back to $\phi$X. All X, Y and Z codes are read and processed in this sequence until another sync code is read.

When an inter-record code (011 followed by 100) is read from the tape following a series of plot codes, the MCFF switches from the *plot* step to the *sync test* step and then to *sync delay*. Concurrently, the PCFF switches from $\phi$X to $\phi$W. At this point, the system may continue on to plot more than one set of data under a single block address, or be caused to stop for the selection of another plot.

If more than one set of data is identified by a single block address, the data is followed by the inter-record code, and the next data sequence is preceded by seven sync codes followed by a start plot code, without another block address. The system accordingly continues to read the tape at normal speed, and if the next seven sync codes are followed by a start plot code, the MCFF switches back to the *plot* step. Thereafter, the X, Y and Z codes are again processed as above described to operate the plotter 11.

If the data which has previously been plotted is followed by another sequence of data identified by a separate plot address, the next seven sync codes are followed by a block address indicator instead of a start plot indicator code. In response to the block address indicator, the MCFF switches to the *search idle* step. In this step, as in the forward search mode, the address provided from the tape is compared to the desired address set into the selection switches. The results of the comparison are not used, however, although the load display signal is provided to actuate the block address display circuits 43 and the MCFF is switched to *plot ready*, with the "plot ready" indicator being lit at the control panel. The sequences are, however, different. If the address from the tape is the same as that set into the selection switches, the MCFF remains in *search idle* until the block address indicator at the end of the address is read, and then switches to the *plot ready* step. If the address which is read and the selected address are different (regardless of which is higher), the MCFF switches through either *search forward test* or *search reverse test* to *plot ready*, at $\phi$W.

*Multiple plot mode.*—When the multiple plot switch on the control panel 34 is pressed, the PL logic term is generated in the same manner as in the single plot mode. In addition, the PLM' logic term is set false. The sequences of the MCFF and PCFF are identical to those occurring in the single plot mode, until the first sequence of data has been plotted and the next block address is read from the tape. It will be recalled that the selection switches are set prior to the multiple plot mode to the address following the last data to be plotted. Accordingly, if after plotting the first data sequence the block address from the tape and the selection switch setting are not identical, the MCFF is in either *search forward test* or *search reverse test* at the end of the digit comparison. Because the PLM' term is false, the MCFF cannot switch to the *plot ready step* from either of these steps. Thus, when the PCFF has reached $\phi$W at the end of a comparison sequence, the MCFF switches back to the *sync delay* step via the *search idle* and *sync test* steps. The next seven sync codes and a start plot code switch the MCFF to *plot* and the plotting sequence is repeated for the next set of data. This process continues for all block addresses, until coincidence occurs between the tape address and the setting of the selection switches. The MCFF then remains in the *search idle* step until the block address indicator is read at the end of the address coincident with $\phi$T, and then switches to the *plot ready* step. At this point the tape is stopped and the system is prepared for the selection of a new plotting address.

BLOCK ADDRESS DISPLAY 43

It has been found extremely convenient to provide a block address display consisting of the three decimal digits which indicate the address of the tape then at the reading station. This not only permits the operator to verify operations and selections if he desires, but permits more ready identification of the step which is next to be undertaken.

Figure 6:
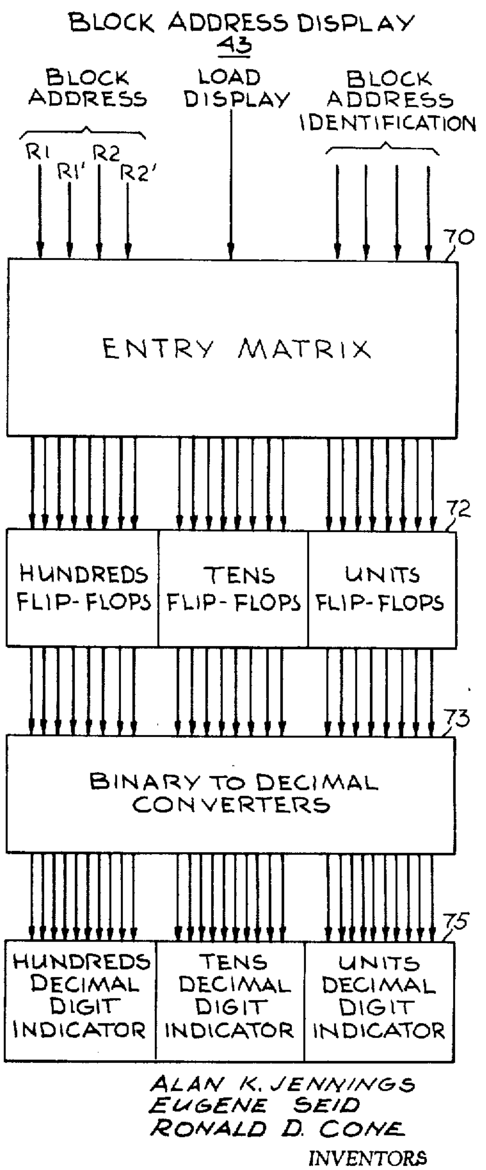
FIG. 6 is a block diagram of one block address display arrangement which may be employed in systems in accordance with the invention.

The input signals which are provided to the block address display 43, illustrated in somewhat greater detail but still in block diagram form in FIG. 6, are the block address data provided from the tape, the load display signal from the mode control circuits 18, and the block address identification signals provided from the phase control circuits 19. The block address information is contained within the R1 and R2 signals, and their complements, which are derived at the reading station. The block address identification signals are provided during the sequencing of the phase counter as the block address is read, either in forward or the reverse direction. The load display signal is provided from the mode control circuits 18 to identify the intervals at which the block address code groups are being read. Thus the block address signals and the block address identification signals which are used are limited to those occurring during the reading of a block address.

Each block address is held in the display 43 until a new address is provided. This is accomplished by the use of four flip-flops which are set to represent the three decimal digits, and the units, tens and hundreds orders which represent the block address. The three different groups of flip-flops may be identified in accordance with the decimal order with which they are associated, and the position they occupy in the order. Thus, for the hundreds digit the four flip-flops may be designated DH1, DH2, DH4 and DH8, with the tens digit flip-flop (lowest binary order) being designated DT1 and the units digit flip-flop (lowest binary order) being designated DU1, etc. A group of logical gating elements coupled to receive the various input signals and constituting an entry matrix 70 are arranged to control the various flip-flops 72 for each of the three decimal orders. The detailed wiring connections are definitively established by the following logical equations, with asterisks as before being used to identify primary equations which are set out in detail below:

1DU1=R1LZ*
0DU1=R1'L2*
1DU2=R2LZ*
0DU2=R2'LZ*
1DU4=R1LY4*
0DU4=R1'LY4*

1DU8=R2LY4*
0DU8=R2'LY4*
1DT1=R1LY3*
0DT1=R1'LY3*
1DT2=R2LY3*
0DT2=R2'LY3*
1DT4=R1LY2*
0DT4=R1'LY2*
1DT8=R2LY2*
0DT8=R2'LY2*
1DH1=R1LY1*
0DH1=R1'LY1*
1DH2=R2LY1*
0DH2=R2'LY1*
1DH4=R1LX*
0DH4=R1'LX*
1DH8=R2LX*
0DH8=R2'LX*

The primary equations are as follows:

LX*=P1*PX*
LY1*=P1*PY1*
LY2*=P1*PY2*
LY3*=P1*PY3*
LY4*=P1*F3F2F1'
LZ*=P1*PZ*

With these circuit connections, each of the units, tens and hundreds flip-flops is set so that within each order there is a binary representation of the corresponding decimal digit which is read from the tape. The binary-valued signals may drive decimal indicators directly, if the indicators themselves are so wired. In the present example, however, additional binary-to-decimal converters 73 are employed to convert the binary values to separate decimal signals on different individual ones of groups of ten lines, to actuate associated decimal digit indicators 75.

ERROR CHECKING SEQUENCE

As is now evident, systems in accordance with the invention do not employ whole-valued signals or reference to standard signal values, but proceed differentially from one point to next on the plot. Nevertheless, a feature of the invention is the provision of error checking steps of a particularly simple but meaningful kind. One such error check may be described in conjunction with the diagram of FIG. 7, to which reference is now made. In preparing a program for the data processor, the programmer may incorporate instructions for the retention of data in addition to the data which is being plotted. Thus, the primary instructions remain the sequence of sets of successive X, Y, and Z axis instructions for controlling the operation of the digital incremental recorder. At the same time, however, the data processor may be constructed to maintain a continuing tabulation of the arithmetical total of the increments of movement along each axis from the origin. For example, negative X increments will be subtracted from positive X increments to provide a total which represents the net deviation, positive or negative, along the X axis.

When the end of the data plot has been reached, these cumulative totals are then used by the data processor in preparing a sequence which returns the plotting instrument to the origin of the plot. By "origin" is meant a point in the vicinity of the origin, from which the plotting instrument then can be caused to define a special pattern which is readily compared to the origin. Thus, the point of origin may be encircled, or placed at the crossing point of an X, or some other symbol, as well as an appropriate written legend may be used. This final checking sequence thus becomes a final part of the data to be plotted.

The relocation of the origin by an appropriate graphic indication provides a very high assurance that no errors otherwise undetectable have transpired in the operation of the system. A missing X or Y axis character would cause a shifting of the plot which is immediately discernible on completion of the checking sequence. The likelihood of compensating errors of the type which would still permit a return to origin while not being evident on the graph or record itself is very low, and indeed the total number of error checks which are available make negligible the probability of an undetected error is all facilities are properly used.

The errors which may occur depend, of course, upon the type of system with which the recorder system is used. The ability to plot both continuous and discontinuous data is of particular benefit with complex plots such as those required for weather maps. Such maps, or similar charts, are readily converted to digital signal instructions which may then be transmitted over a readily narrow-band network such as a telephone system. Here, transients, noise, and line variations may cause individual characters to be lost, and large signal spikes to appear. These short term effects, however, do not have any appreciable effects on records prepared in accordance with the present invention. One reason is that by using differentially-valued instructions, all instruction digits are of the least significant order of magnitude. Contrast this to the system using whole values, in which the most significant digit may be lost. Thus, small and short-term errors result in only minute errors in the movement of the plotting instrument in carrying out the erroneous instructions. At the same time, large transients cannot result in an error of more than one increment, so that such aberrations are virtually eliminated and not merely filtered out by systems in accordance with the invention.

SUMMARY

The versatility and wide range of capabilities of systems in accordance with the invention will now be evident. Continuous as well as discontinuous data can be plotted to form lines, broken lines, characters, messages and special symbols. Ideographs and arabic characters, as well as any desired special representation can be formed by recorder systems in accordance with the invention. This capability results in part from the fact that the increments of movement are of the same dimensional order as the width of the line which is being formed. A contributing factor also is the simultaneous movement in X and Y directions to provide a total of eight possible directions of movement between the recording instrument and the record medium. Perhaps the primary consideration which results in this capability, however, as far as the recorder is concerned, is the fact that small increments of movement can be undertaken at high speeds which permit a great amount of data to be plotted rapidly.

Another important feature of the system is the organization of the control function in a fashion such that the magnetic tape unit can be operated in discontinuous fashion without requiring buffering mechanisms of either the mechanical or the electronic type. Many significant advantages are derived from the use of different clock rates in the control system. The clock rate is normally tied to the data being reproduced from the tape, and through the use of the integrated deskewing circuits provides an improved and stable operation. Through the use of the inhibition of the clock pulses for selected times determined by the clock pulses themselves, the much slower clock rate is also made available for particular transition intervals. This slower clock rate has a dual function. It permits the sequencing of the electronic circuits to be carried out at a slow rate, while at the same time it permits compensation for the slow changes in starting, stopping, and reversing the tape, and the like. Note however, that there is no functional change in the sequencing of the control circuits, so that the need for special control sequences and circuits has been eliminated. Another advantage which is derived from this arrangement resides in the fact that any selected number of slow clock intervals may be employed for a particular delay function. Further, these variable delay intervals can be chosen merely by proper selection of the mode and phase relationships.

Accordingly, it is evident that the invention makes feasible the use of a low cost tape transport or other data storage having slow start, stop and reverse times. The intervals needed to provide mechanical handling of the tape in discontinuous sequences are automatically provided under control of the electronic controls, but these are so arranged as to sequence properly at the same time. The combination of delay intervals and change of clock rate mean that there is essentially no buffering or adjustment of data rate between the source of data and the recorder. At the most, it can be said that there is only one bit time of buffering in delaying the X control so that the X signal provides concurrent control with the Y signal at the recorder The entirely digital operation of the system and the use of differentially-valued signals to control stepping does not adversely affect, but actually appears to enhance, system reliability. While-valued signals and reference signals are neither needed nor employed with this arrangement. Accordingly, reliance is placed upon the successive reading of the X, Y and Z signals and the proper sequencing of data. It has previously been mentioned that if a data bit is missing, the system immediately begins to plot in a distinctive and unlike manner to make the error evident. With the use of the enabling track and at least one binary 1 for the instructions, however, it has been found that the reliability of the system is compatible with that of the data processor itself. Recording systems in accordance with the invention may plot continuously for hours at a rate of 200 changes per second without error. In actual examples of system operations, complex plots programmed to follow devious patterns and to ultimately end at a selected starting point are plotted faultlessly. Further, in repeating the same program the system will retrace the entire plot and will end at the same point, following each increment of movement so closely that no dual trace whatsoever is evident.

A further advantage resides in the variables which can be used in plotting because of the flexibility of the digital incremental technique. If all values fall within a certain range, the plot axis can be offset accordingly. It will be appreciated that an unlimited range of offset is available. Similarly, the scale factors which are used can be increased or decreased by whole or fractional parts in processing the plot data, as to provide the best graphic presentation.

What is claimed is:

1. A system for providing graphical plots, which plots include substantially visually continuous and discontinuous marks directly from digital data, including the combination of a data processor providing a succession of groupings of three groups of binary words each having binary-valued digits, a plotter including a controllable recording member which is incrementally movable in each of two orthogonal directions relative to a record member such that each incremental movement of the recording member is initiated from the location of termination of the last previous movement of the recording member relative to the record member, the maximum increments of movement in each direction being substantially no greater than $1/100$ inch, and means responsive to the digits from the data processor and coupled to control the incremental movements of the recording member in each of the two directions relative to the record member.

2. An off-line system for receiving digital data from a digital computer for providing, from said digital data, both continuous and discontinuous record plots and including off-line data processor means operating at a speed different from said computer and providing successive sets of digital incremental instructions, each incremental instruction set including arbitrary X, Y and Z plot axis instructions, and graphical plotter means including a recording member incrementally movable on the Z axis and one of the X or Y axes, and a record member incrementally movable on the other of the X or Y axes such that each incremental movement of the recording member is initiated from the location of termination of the last previous movement of the recording member relative to the record member the recording member and record member being coupled to be controlled by the digital incremental instructions.

3. An off-line system for receiving digital data from an external source and for providing record plots from said digital data and including data storage means for storing said data and providing successive sets of digital incremental instructions, each incremental instruction set including arbitrary X, Y and Z plot axis instructions, and graphical plotter means including a recording member incrementally movable on the Z axis and one of the X or Y axes, and a record member incrementally movable on the other of the X or Y axes such that each incremental movement of the recording member is initiated from the location of termination of the last previous movement of the recording member relative to the record member, the recording member and record member being coupled to be controlled by the sets of digital incremental instructions.

4. A system for providing graphical plots which includes substantially visually continuous and discontinuous data plots directly from digital data, including the combination of means providing a series of digital characters to be plotted, each of the characters consisting of binary digits in parallel, the characters being arranged in sequences of three representing X, Y and Z axis instructions, a plotter including a controllable recording member and a record member, the controllable recording member being incrementally movable relative to the record member along the X and Y axis directions such that each incremental movement of the recording member is initiated from the location of termination of the last previous movement of the recording member relative to the record member, and being operable to be associated with or disassociated from the record member along the Z axis, the maximum increments of movement of the recording member relative to the record member in the X and Y directions being substantially no greater than $1/100$ inch, means responsive to the digital characters and coupled to control the first named means for selecting a desired series of digital characters, and means responsive to the desired series of digital characters and coupled to the plotter for controlling the relative movement of the recording member relative to the record member in substantially simultaneous steps in the X and Y axes to provide a vector summation thereof, and also for controlling the relative position of the recording member on the Z axis.

5. A plotter system for receiving output digital data from a computer comprising: off-line means for storing said digital data, said data being grouped to include address information and data corresponding thereto to be plotted, means coupled to the storing means for reproducing the stored digital data, digital incremental recorder means coupled to receive the reproduced digital data, said recorder means including a recording member and a record member, said recording member incrementally movable on the Z axis and on the X and Y axes relative to said record member such that each incremental movement of the recording member is initiated from the location of termination of the last previous movement of the recording member relative to the record member, and control means responsive to the address information and coupled to control the operation of the recorder means with selected stored data.

6. A system for presenting graphical representations from digitally stored data including a record member, a plotting member which is selectively engageable with the record member, digitally controllable means coupled to the record member and the plotting member for providing incremental relative movements therebetween in each of two orthogonal directions such that each incremental movement of the plotting member is initiated from the location of termination of the last previous movement of the plotting member relative to the record member, off-line means for storing digital data on a movable storage medium, the digital data being arranged in predetermined groupings, each including an address identification grouping, synchronizing groupings and data to be graphically represented, the data comprising differentially-valued digital groupings, means for reproducing the digital data, means responsive to the address and synchronizing groupings and coupled to control the movable storage medium for selecting data to be graphically represented, and means responsive to the differentially-valued digital groupings for controlling the digitally controllable means and the plotting member engagement with the record member.

7. A system for presenting graphical representations from digitally stored data including a continuous chart record member, a recording member which is selectively engageable with the record member to plot thereon, first controllable means coupled to the record member for moving the record member in incremental steps along its longitudinal axis, second controllable means coupled to the recording member for moving the recording member in incremental steps transversely relative to the record member longitudinal axis such that each incremental step of the recording member is initiated from the location of termination of the last previous step of the recording member relative to the record member, a tape data storage system, the tape data storage system including digital data arranged sequentially along the tape and means for reproducing the digital data, the digital data being disposed in predetermined groupings, each including an address identification grouping, synchronizing groupings disposed symmetrically relative to the address identification grouping, and data to be graphically represented, the data comprising a series of incremental instructions, means responsive to the address and synchronizing groupings and coupled to control the tape data storage system for moving the tape to a selected address at high speed, means responsive to the selection of a desired address for advancing the tape at a selected low speed, and means responsive to the selected data to be represented for sugstantially simultaneously controlling the first and second controllable means.

8. A system for recording plots of digital data including a magnetic tape record system having high and low speeds in both forward and reverse directions, the magnetic tape of the record system including plot data identified by associated address information having synchronizing information disposed symmetrically thereabout, means operatively associated with the tape for reproducing the data, the address information and the synchronizing information therefrom, a digital incremental recorder responsive to control signals and coupled to receive signals from the reproducing means, said incremental recorder including a recording member and a record member, said recording member being incrementally movable relative to said record member along the X and Y axes such that each incremental movement of the recording member is initiated from the location of termination of the last previous increment of the recording member relative to the record member, and a control system coupled to control the magnetic tape system and the recorder, and coupled to receive signals from the reproducing means, the control system including means for selecting the address of data to be plotted, means responsive to the selected address and to signals reproduced from the tape for advancing the tape at high speed to the selected address, means responsive to the reproduced signals for identifying the selected address, and means responsive to the identification of the selected address for operating the recorder under control of the reproduced data in a controlled sequence.

9. A system for providing continuous and discontinuous graphic plots in response to input data, comprising, a recorder system including a record medium and an incrementally movable plotting instrument, and means responsive to the input data for providing differential vector increment input signals which control the plotting instrument in incremental movements relative to the record medium, such that each incremental movement of the plotting instrument is initiated from the location of termination of the last previous movement of the plotting instrument, the incremental movements each being of the same dimensional order of magnitude as the width of the line provided by the plotting instrument, thereby to provide arbitrary symbol capability.

10. A system for providing continuous and discontinuous graphic plots comprising a recorder system including a record medium and a digital incremental movable plotting instrument, stepping means for moving the plotting instrument and record medium in differential vector increments such that each incremental movement of the plotting instrument is initiated from the location of termination of the last previous movement of the plotting instrument relative to the record member along two axes which are independent with respect to each other in response to control signals, and means providing successive sequences of differential vector increment control signals to govern the operation of the stepping means.

11. A system for providing continuous and discontinuous graphic plots, comprising: a recorder system including a record medium, an incrementally movable plotting instrument providing a record line of a predetermined width, controllable stepping means coupled to the record medium and the incrementally movable plotting instrument for providing relative movement between the record medium and the plotting instrument in two orthogonal directions and in incremental steps which are of approximately the same dimension as the record line width, and the recorder system also including means for selectively engaging the plotting instrument with the record medium, means providing a succession of groups of control signals representing data to be plotted, the control signals being in the form of sequences of differential vector increment binary patterns, each controlling a different plotting variable, means responsive to the control signals and coupled to control the stepping means to provide substantially simultaneous movement of the plotting instrument relative to the record medium in each of the two orthogonal directions such that each incremental movement of the plotting instrument is initiated from the location of termination of the last previous movement of the plotting instrument relative to the record member, and means responsive to the control signals for controlling the means for selectively engaging the plotting instrument with the record medium.

12. In a system for preparing graphical records, an instruction record including the combination of differentially-valued sequences of instructions for defining incremental plotting steps from an origin, each incremental plotting step being initiated from the location of termination of the last previous plotting step, and a differentially-valued sequence of error checking instructions for defining incremental steps returning to the origin.

13. In a system for preparing graphical records from digital data on a storage medium, the combination of successive sets of differentially-valued data instructions for defining incremental plotting steps in two independent directions from an origin, each incremental plotting step being initiated from the location of termination of the last previous plotting step, successive sets of differentially-valued error check instructions for defining plotting steps to return to the vicinity of the origin, and successive sets of differentially-valued special symbol instructions for defining a spatial displacement relative to the origin.

14. A system for providing graphical plots from digital data including the combination of a magnetic tape reproducing system, the reproducing system including a magnetic tape bearing a succession of command characters in serial form, each of the command characters consisting of three parallel binary digits, the command characters being grouped in successions of three representing individual commands for different graphical plot axes, the reproducing system transporting the magnetic tape, and including means for reproducing command signal combinations representative of the command characters, a digital incremental plotter including controllable recording member means and record member means which are incrementally movable in each of two orthogonal directions relative to each other such that each incremental movement of the recording member is initiated from the location of termination of the last previous movement of the recording member relative to the record member, the controllable recording member means also being movable toward and away from the record member means, the maximum increments of movement in each direction being substantially no greater than 1/100 inch, and interconnecting means responsive to the command signal combinations and coupled to the controllable recording member means and the record member means, for controlling the movements thereof.

15. The system claimed in claim 14, wherein said recording member means and record member means are controlled by said interconnecting means to receive simultaneous commands from a given succession of three command characters.

16. A system for providing digital incremental graphical plots from digital data including the combination of a magnetic tape reproducing system, the reproducing system including a magnetic tape bearing a succession of command characters in serial character form, each of the command characters consisting of three parallel binary digits, one in each of three parallel recording tracks, and including one selected digital value in a selected one of the recording tracks for each command character, the command characters being grouped in successions of three representing commands for X, Y and Z graphical plot axes; the recording system including means for transporting the magnetic tape continuously at a selected speed during preparation of the digital incremental graphical plots; and further including means for reproducing command signal combinations representative of the command characters; a digital incremental plotter including a controllable recording member and a controllable record member means, each being incrementally movable in a different one of two orthogonal directions in response to receipt of a command signal such that each incremental movement of the recording member is initiated from the location of termination of the last previous movement of the recording member relative to the record member, the maximum increments of movement in each direction being substantially no greater than 1/100 inch, said controllable recording member also including means for movement of said recording member toward and away from the record member means, and interconnecting means responsive to the command signal combinations and coupled to the controllable recording member and the record member means, for controlling the incremental movements thereof by controlling the transission of command signals to said recording member and said record member means, the command signals for the X and Y plot axes being fed simultaneously to said recording member and record member means to produce simultaneously executed relative incremental movements such that eight different plotting increments are provided for the X and Y axis, the directions of the plotting increments differing by 45° angles to provide respective X, XY, Y, —X, —XY, X—Y, —X—Y, and —Y direction incremental plot movements.

17. A system for providing digital incremental graphical plots from digital data including the combination of a magnetic tape reproducing system, the reproducing system including a magnetic tape bearing a succession of command characters in serial character form, the command characters providing commands for at least X and Y graphical plot axes; the reproducing system including means for reproducing command signal combinations representative of the command characters, a digital incremental plotter including a controllable recording member and a controllable record member means, each being incrementally movable in a different one of two orthogonal directions in response to receipt of a command signal such that each incremental movement of the recording member is initiated from the location of termination of the last previous movement of the recording member relative to the record member, and interconnecting means responsive to the command signal combinations and coupled to the controllable recording member and the record member means, for controlling the incremental movements thereof by controlling the transmission of command signals to said recording member and said record member means, the command signals for the X and Y plot axes being fed simultaneously to said recording member and record member means to produce simultaneously executed relative incremental movements such that eight different plotting increments are provided for the X and Y axes, the directions of the plotting increments differing by 45° angles to provide respective X, XY, Y, —X, —XY, X—Y, —X—Y, and —Y direction incremental plot movements.

18. An off-line system for providing, directly from digital data, both continuous and discontinuous record plots, the system including data processor means providing successive sets of digital incremental instructions, each incremental instruction set including arbitrary X, Y and Z plot axis instructions, the separate plot axis instructions being provided sequentially within a set, graphical plotter means including a recording member controllably movable on the Z axis and one of the X or Y axes, and a record member controllably movable on the other of the X or Y axes such that each incremental movement of the recording member is initiated from the location of termination of the last previous movement of the recording member relative to the record member, the recording member and record member being coupled to be controlled by the respective X and Y plot axis instructions, and means responsive to the plot axis instructions and coupled to control the graphical plotter means to provide the X and Y plot axis instructions simultaneously.

19. A system for providing graphical plots which include substantially visually continuous and discontinuous data plots directly from digital data, including the combination of means providing a series of digital characters to be plotted, each of the characters consisting of three binary digits in parallel, the characters being arranged in sequences of three representing X, Y and Z axis instructions, one binary digit in a given position of each character comprising a binary one-valued digit representative of a clock track, a plotter including a controllable recording member and a record member, the controllable recording member being incrementally movable relative to the record member along the X and Y axis directions such that each incremental movement of the recording member is initiated from the location of termination of the last previous movement of the recording member relative to the record member, and being operable to be associated with or disassociated from the record member along the Z axis, the maximum increments of movement of the recording member relative to the record member in the X and Y directions being substantially no greater than 1/100 inch, means responsive to the digital characters and coupled to operate the first named means at a selected relatively high rate of speed for selecting a desired series of digital characters, means responsive to the selection of a desired series of digital characters and coupled to control the first named means for operating the first named means at a lower speed for the reproduction of the desired series of digital characters, and means responsive to the desired series of digital characters and to the binary one-valued digits and coupled to the plotter for controlling the relative movement of the recording member relative to the record member in substantially simultaneous steps in the X and Y axis, and also for controlling the relative position of the recording member on the Z axis.

20. A system for providing graphical plots which include substantially visually continuous and discontinuous data plots directly from digital data, including the combination of means providing a series of digital characters to be plotted, each of the characters consisting of three binary digits in parallel, the characters being arranged in sequences of three representing X, Y and Z axis instructions, one binary digit in a given position of each character comprising a binary one-valued digit representative of a clock track, a plotter including a controllable recording member and a record member, the controllable recording member being incrementally movable relative to the record member along the X and Y axis directions such that each incremental movement of the recording member is initiated from the location of termination of the last previous movement of the recording member relative to the record member, and being operable to be associated with or disassociated from the record member along the Z axis, means responsive to the digital characters and coupled to operate the first named means at a selected relatively high rate of speed for selecting a desired series of digital characters, means responsive to the selection of a desired series of digital characters and coupled to control the first named means for operating the first named means at a lower speed for the reproduction of the desired series of digital characters and interconnecting means responsive to the desired series of digital characters and to the binary one-valued digits and coupled to the plotter for controlling the relative movement of the recording member relative to the record member, the instructions for the X and Y plot axes being fed simultaneously to said recording member and record member to produce simultaneously executed relative incremental movements such that eight different plotting increments are provided for the X and Y axis, the directions of the plotting increments differing by 45° angles to provide respective X, XY, Y, −X, −XY, X−Y, −X−Y, and −Y direction incremental plot movements.

21. A plotter system comprising means for storing digital data, the data being grouped to include address information data and data corresponding thereto to be plotted, means coupled to the storing means for reproducing the digital data in a continuous sequence at a selected synchronous transfer rate, digital incremental plotter means coupled to receive the reproduced digital data to be plotted, control means responsive to the identification data and coupled to control the operation of the plotter means with selected stored data, and means responsive to the selected stored data for operating the digital incremental plotter means in successive incremental steps in response to the synchronously provided data, each incremental plotting step being initiated from the location of termination of the last previous plotting step.

22. A system for providing digital incremental graphical plots from digital data including the combination of a magnetic tape reproducing system, the reproducing system including a magnetic tape bearing a succession of command characters in serial character form, the command characters providing commands for at least X and Y graphical plot axes; the reproducing system including means for reproducing command signal combinations representative of the command characters at a first relatively low rate of speed and for reproducing other signal combinations at a second relatively high rate of speed, a digital incremental plotter including a controllable recording member and a controllable record member means, each being incrementally movable in a different one of two orthogonal directions in response to receipt of individual command signal characters such that each incremental movement of the recording member is initiated from the location of termination of the last previous movement of the recording member relative to the record member, means responsive to said other signal combinations and coupled to operate said reproducing system at said first relatively low rate of speed in response to the selection of a desired series of said other signal combinations, and interconnecting means responsive to the command signal combinations and coupled to the controllable recording member and the record member means, for controlling the incremental movements thereof by controlling the transmission of command signals to said recording member and said record member means, the command signals for the X and Y plot axes being fed simultaneously to said recording member and record member means to produce simultaneously executed relative incremental movements such that eight different plotting increments are provided for the X and Y axes, the directions of the plotting increments differing by 45° angles to provide respective X, XY, Y, −X, −XY, X−Y, −X−Y, and −Y direction incremental plot movements.

23. A system for providing continuous and discontinuous graphic plots comprising a recorder system including a record medium and an incrementally movable plotting instrument, stepping means for moving the plotting instrument and record medium along two axes which are independent with respect to each other in response to control signals, means providing successive sequences of differential vector increment control signals to govern the operation of the stepping means, said means including an instruction record having differential vector increment sequences of instructions for defining the movement of said stepping means from an origin, each incremental plotting step being initiated from the location of termination of the last previous plotting step, and having differential vector increment sequences of error checking instructions for defining the movement of said stepping means in returning to the origin.

References Cited by the Examiner

UNITED STATES PATENTS

| | | | |
|---|---|---|---|
| 1,641,199 | 9/27 | Roucka | 346—34 |
| 2,639,964 | 5/53 | Keinath | 346—33 |
| 2,787,511 | 4/57 | Ehret | 346—29 |
| 2,873,912 | 2/59 | Bush | 235—61.7 |
| 2,900,132 | 8/59 | Burns | 235—61.7 |
| 2,953,694 | 9/60 | Wilson | 307—88.5 |
| 2,970,226 | 1/61 | Skelton et el. | 307—88.5 |
| 3,005,189 | 10/61 | O'Brien | 340—174.1 |
| 3,032,268 | 5/62 | Lucas | 235—177 |
| 3,091,392 | 5/63 | Arya | 235—177 |
| 3,103,000 | 9/63 | Newman et al. | 340—174.1 |

ROBERT C. BAILEY, *Primary Examiner.*

MALCOLM A. MORRISON, *Examiner.*